US011712945B2

(12) United States Patent
Ding et al.

(10) Patent No.: US 11,712,945 B2
(45) Date of Patent: Aug. 1, 2023

(54) ELECTRIC HEATER

(71) Applicant: Hangzhou Sanhua Research Institute Co., Ltd., Zhejiang (CN)

(72) Inventors: Saijun Ding, Zhejiang (CN); Weidong Xi, Zhejiang (CN)

(73) Assignee: Hangzhou Sanhua Research Institute Co., Ltd., Zhejiang (CN)

( * ) Notice: Subject to any disclaimer, the term of this patent is extended or adjusted under 35 U.S.C. 154(b) by 766 days.

(21) Appl. No.: 16/626,251

(22) PCT Filed: Jul. 2, 2018

(86) PCT No.: PCT/CN2018/093958
§ 371 (c)(1),
(2) Date: Dec. 23, 2019

(87) PCT Pub. No.: WO2019/001585
PCT Pub. Date: Jan. 3, 2019

(65) Prior Publication Data
US 2020/0156443 A1    May 21, 2020

(30) Foreign Application Priority Data

Jun. 30, 2017  (CN) .......................... 201710521371.8
Jun. 30, 2017  (CN) .......................... 201710521373.7
(Continued)

(51) Int. Cl.
*F24H 1/00*  (2022.01)
*F24H 1/12*  (2022.01)
(Continued)

(52) U.S. Cl.
CPC ......... *B60H 1/2218* (2013.01); *B60H 1/2221* (2013.01); *F24H 1/009* (2013.01);
(Continued)

(58) Field of Classification Search
None
See application file for complete search history.

(56) References Cited

U.S. PATENT DOCUMENTS 941,215 A  * 11/1909  Wade ...................... F28F 3/048
                                                         392/494
3,782,456 A  * 1/1974   Gusmer ................... F28F 7/02
                                                         165/83

(Continued)

FOREIGN PATENT DOCUMENTS

CN        101090590 A        12/2007
CN        201522078 U        7/2010
(Continued)

OTHER PUBLICATIONS

First Office Action for Chinese Application No. 201710521373.7, dated Feb. 6, 2020.
(Continued)

*Primary Examiner* — Thor S Campbell
(74) *Attorney, Agent, or Firm* — Wolf, Greenfield & Sacks, P.C.

(57) ABSTRACT

An electric heater includes a heating element, a heat transfer wall and a control module. The electric heater includes a fluid chamber, an inlet, and an outlet. The fluid chamber is in communication with the inlet and the outlet, the heat transfer wall is a portion of a wall part forming the fluid chamber, the heating element is fixed or limited to at least a portion of the heat transfer wall, the heating element is located outside the fluid chamber, and at least a portion of the heating element is in contact with the heat transfer wall. The electric heater includes a cover body wall, which is another portion of the wall part forming the fluid chamber. The control module is located outside the cover body wall, the control module is located outside the fluid chamber, the
(Continued)

control module is electrically connected to the heating element.

18 Claims, 15 Drawing Sheets

(30) Foreign Application Priority Data

| Jun. 30, 2017 | (CN) | .................. | 201710521492.2 |
|---|---|---|---|
| Jun. 30, 2017 | (CN) | .................. | 201710521501.8 |
| Jun. 30, 2017 | (CN) | .................. | 201710521503.7 |
| Jun. 30, 2017 | (CN) | .................. | 201710521711.7 |
| Jun. 30, 2017 | (CN) | .................. | 201710521712.1 |
| Jun. 30, 2017 | (CN) | .................. | 201710521713.6 |
| Jun. 30, 2017 | (CN) | .................. | 201710521722.5 |

(51) Int. Cl.
*F24H 9/02* (2006.01)
*F24H 9/1818* (2022.01)
*H05B 3/42* (2006.01)
*B60H 1/22* (2006.01)

(52) U.S. Cl.
CPC .............. *F24H 1/121* (2013.01); *F24H 9/02* (2013.01); *F24H 9/1818* (2013.01); *H05B 3/42* (2013.01); *H05B 2203/021* (2013.01); *H05B 2203/035* (2013.01)

(56) References Cited

U.S. PATENT DOCUMENTS

| 4,177,375 | A * | 12/1979 | Meixner | ............... | H05B 3/141 |
| | | | | | 219/448.11 |
| 4,334,141 | A * | 6/1982 | Roller | ................. | A47J 31/545 |
| | | | | | 219/505 |
| 4,343,988 | A * | 8/1982 | Roller | ................. | A47J 31/545 |
| | | | | | 392/467 |
| 4,508,957 | A * | 4/1985 | Rocchitelli | ............ | B60S 1/488 |
| | | | | | 392/479 |
| 4,687,907 | A * | 8/1987 | Barkley | ............. | H05K 13/0486 |
| | | | | | 228/234.1 |
| 5,438,642 | A * | 8/1995 | Posen | ..................... | H05B 3/82 |
| | | | | | 392/491 |
| 6,816,670 | B1 * | 11/2004 | Renau | .................... | F24H 1/121 |
| | | | | | 392/467 |
| 6,873,793 | B2 | 3/2005 | Thweatt, Jr. | | |
| 6,912,357 | B2 * | 6/2005 | Bissonnette | ............ | F24H 1/121 |
| | | | | | 137/341 |
| 6,952,524 | B2 * | 10/2005 | Bissonnette | ............ | F24H 1/121 |
| | | | | | 392/479 |
| 7,190,893 | B2 * | 3/2007 | Kuebler | ................. | F24H 1/121 |
| | | | | | 392/494 |
| 7,286,752 | B2 * | 10/2007 | Gourand | ................ | H05B 3/262 |
| | | | | | 392/479 |
| 7,760,993 | B2 * | 7/2010 | You | ........................ | F22B 27/14 |
| | | | | | 392/494 |
| 7,796,868 | B2 * | 9/2010 | Kaastra | ................... | F24H 1/121 |
| | | | | | 392/484 |
| 7,813,628 | B2 * | 10/2010 | Haan | ....................... | F22B 1/288 |
| | | | | | 392/397 |
| 8,107,803 | B1 * | 1/2012 | Hannah | ............... | A47J 31/4403 |
| | | | | | 392/494 |
| 8,358,922 | B2 * | 1/2013 | Stickel | .................. | A47J 31/545 |
| | | | | | 392/494 |
| 8,561,917 | B2 * | 10/2013 | Arkasjevski | ......... | F28F 19/006 |
| | | | | | 239/128 |
| 8,607,694 | B2 * | 12/2013 | Blanc | ..................... | A47J 31/54 |
| | | | | | 99/302 R |
| 8,917,981 | B2 * | 12/2014 | Trebouet | ................ | B60S 1/487 |
| | | | | | 392/502 |
| 8,938,845 | B2 * | 1/2015 | Grandjean | .............. | F24H 1/009 |
| | | | | | 15/250.04 |
| 9,127,762 | B2 * | 9/2015 | Oh | ....................... | F16H 57/0413 |
| 9,161,391 | B2 * | 10/2015 | Niederer | ............... | F24H 9/1827 |
| 9,631,835 | B2 * | 4/2017 | De Mango | ........... | A47J 31/542 |
| 9,803,886 | B2 * | 10/2017 | Chang | .................... | H05B 3/262 |
| 9,895,957 | B2 | 2/2018 | Eckert et al. | | |
| 10,132,525 | B2 * | 11/2018 | Klein | ...................... | F24H 1/102 |
| 11,002,465 | B2 * | 5/2021 | Liu | .......................... | H05B 3/44 |
| 2002/0071665 | A1 | 6/2002 | Bliek et al. | | |
| 2004/0170412 | A1 | 9/2004 | Kuebler et al. | | |
| 2005/0072557 | A1 | 4/2005 | Lai | | |
| 2005/0205552 | A1 | 9/2005 | Han et al. | | |
| 2009/0001071 | A1 | 1/2009 | Kulkarni | | |
| 2011/0127247 | A1 | 6/2011 | Choi et al. | | |
| 2011/0174160 | A1 * | 7/2011 | Blanc | ...................... | F24H 1/121 |
| | | | | | 99/288 |
| 2011/0188839 | A1 | 8/2011 | Trebouet | | |
| 2012/0037606 | A1 | 2/2012 | Huang et al. | | |
| 2012/0085742 | A1 | 4/2012 | Niederer et al. | | |
| 2013/0026151 | A1 * | 1/2013 | Adachi | ................. | F24H 3/0429 |
| | | | | | 219/202 |
| 2013/0191985 | A1 | 8/2013 | Qin et al. | | |
| 2014/0319125 | A1 | 10/2014 | Bohlender et al. | | |
| 2015/0034626 | A1 | 2/2015 | Kominami et al. | | |
| 2015/0090802 | A1 | 4/2015 | Eckert et al. | | |
| 2015/0214676 | A1 | 7/2015 | Humberg et al. | | |
| 2015/0343883 | A1 | 12/2015 | Gu et al. | | |
| 2017/0016421 | A1 | 1/2017 | Øen et al. | | |
| 2017/0138632 | A1 | 5/2017 | Marco et al. | | |
| 2017/0370614 | A1 * | 12/2017 | Liu | ....................... | F24H 9/0015 |
| 2022/0136733 | A1 * | 5/2022 | Fu | ........................ | F24H 1/0018 |
| | | | | | 392/482 |

FOREIGN PATENT DOCUMENTS

| CN | 102200339 | A | 9/2011 |
| CN | 102239368 | A | 11/2011 |
| CN | 102338469 | A | 2/2012 |
| CN | 102444985 | A | 5/2012 |
| CN | 102767896 | A | 11/2012 |
| CN | 103228998 | A | 7/2013 |
| CN | 104121695 | A | 10/2014 |
| CN | 104955666 | A | 9/2015 |
| CN | 204853983 | U | 12/2015 |
| CN | 205351746 | U | 6/2016 |
| CN | 105783246 | A | 7/2016 |
| CN | 106104165 | A | 11/2016 |
| CN | 106642654 | A | 5/2017 |
| CN | 106766127 | A | 5/2017 |
| CN | 108266889 | A | 7/2018 |
| EP | 2 844 942 | A1 | 3/2015 |
| EP | 2 884 198 | A1 | 6/2015 |
| JP | 2013-220707 | A | 10/2013 |
| JP | 2016-167369 | A | 9/2016 |
| JP | 2016-203733 | A | 12/2016 |
| KR | 2004-0079760 | A | 9/2004 |
| KR | 2010-0011514 | A | 2/2010 |
| KR | 2015-0032990 | A | 4/2015 |
| KR | 2016-0091002 | A | 8/2016 |
| WO | WO 2004/078538 | A2 | 9/2004 |
| WO | WO 2013/164314 | A1 | 11/2013 |

OTHER PUBLICATIONS

First Office Action for Chinese Application No. 201710521492.2, dated Dec. 31, 2019.
First Office Action for Chinese Application No. 201710521501.8, dated Mar. 18, 2020.
Extended European Search Report for European Application No. 18822801.9, dated Feb. 4, 2021.
Examination Report for Indian Application No. 202017001090, dated Sep. 2, 2020.
First Office Action for Chinese Application No. 201710521712.1, dated Jul. 19, 2019.
First Office Action for Chinese Application No. 201710521503.7, dated Dec. 31, 2019.

(56) References Cited

OTHER PUBLICATIONS

International Search Report and Written Opinion for International Application No. PCT/CN2018/093958, dated Sep. 19, 2018.

* cited by examiner

ELECTRIC HEATER

This Application is a national stage filing under 35 U.S.C. § 371 of International Patent Application Serial No. PCT/CN2018/093958, filed Jul. 2, 2018, which claims priority to the following Chinese patent applications, No. 201710521371.8, titled "ELECTRIC HEATER",
No. 201710521373.7, titled "ELECTRIC HEATER",
No. 201710521492.2, titled "ELECTRIC HEATER",
No. 201710521501.8, titled "ELECTRIC HEATER",
No. 201710521503.7, titled "ELECTRIC HEATER",
No. 201710521711.7, titled "ELECTRIC HEATER",
No. 201710521712.1, titled "ELECTRIC HEATER",
No. 201710521713.6, titled "ELECTRIC HEATER",
No. 201710521722.5, titled "ELECTRIC HEATER", filed with the China National Intellectual Property Administration, on Jun. 30, 2017, the entire contents of these applications are incorporated herein by reference in their entirety.

FIELD

The present application relates to the technical field of vehicles, and in particular to an electric heater.

BACKGROUND

At present, a metal tube electric heater is commonly used as an electric heater for vehicle, which directly immerses an electric heating tube into a working medium and energizes the electric heating tube to heat. Although the metal tube electric heater has a high thermal efficiency and generates heat fast, there is sometimes a danger that the metal tube may be corroded by the working medium.

SUMMARY

An object of the present application is to provide an electric heater which is capable of preventing a heating element from direct contact with the working medium in a heating fluid cavity.

The following technical solution is provided according to the present application: an electric heater includes a heating element, a heat transfer wall and a control module, where the electric heater includes a fluid cavity, an inlet and an outlet, the fluid cavity is in communication with the inlet and the outlet, the heat transfer wall is a part of a wall portion forming the fluid cavity, the heating element is fixed or position-limited to at least part of the heat transfer wall, the heating element is located outside the fluid cavity, and at least part of the heating element is in contact with the heat transfer wall; and the electric heater includes a cover-body wall, the cover-body wall is another part of the wall portion forming the fluid cavity, the control module is located outside the cover-body wall, the control module is located outside the fluid cavity as well, and the control module is electrically connected with the heating element.

The electric heater according to the present application is fixed or position-limited to at least part of the heat transfer wall through the heating element, and the heating element is located outside the fluid cavity, such that the heating element can heat the working medium in the fluid cavity without direct contact with the working medium. In addition, the control module is located outside the cover-body wall as well as the fluid cavity. Through the arrangement of the heat transfer wall and the cover-body wall, the influence of the heat generated by the heating element on the control module can be relatively reduced.

DETAILED DESCRIPTION OF THE EMBODIMENTS

Figure 1:
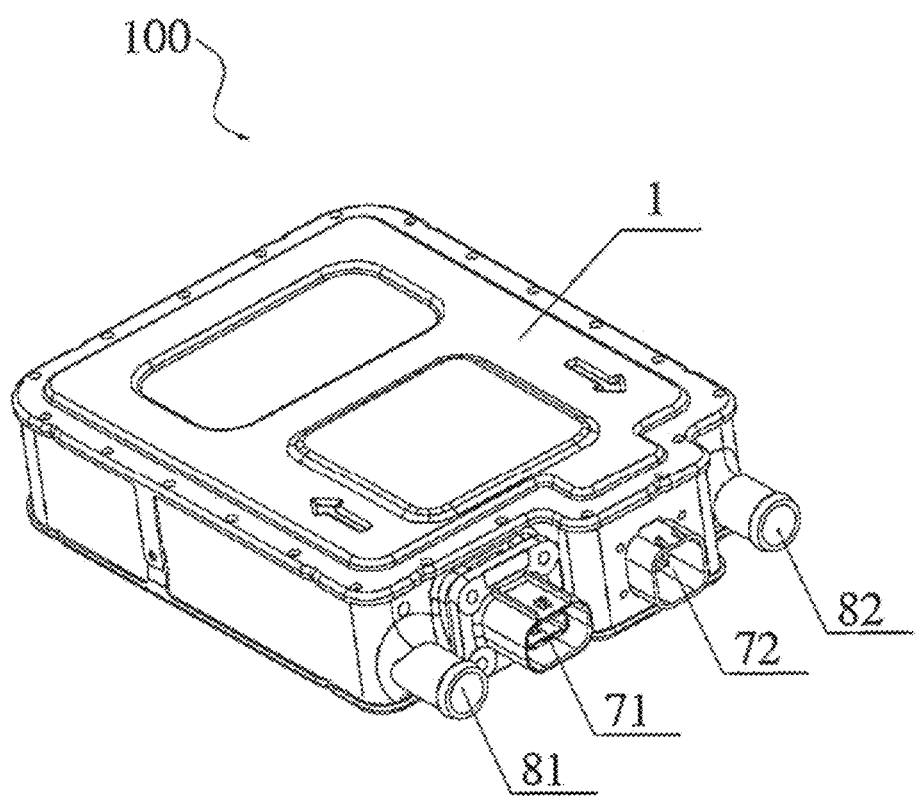
FIG. 1 is a schematic perspective view of an electric heater according to the present application.

The present application is further illustrated hereinafter in conjunction with drawings and specific embodiments.

An electric heater can convert electric energy into heat energy, and is suitable for heating a working medium in a state of liquid or vapor-liquid mixture. The heating means is to energize the electric heater, such that a heating element generates heat and heats the working medium after being energized. The electric heater can be used in situations where heating is required such as vehicles or other mobile devices, for supplying heat or warming up.

A technical solution is provided according to the present application. An electric heater 100 includes a heating element 6, a control module 5, a conductive element 31 and a partition portion 3. The heating element 6 is electrically connected with the control module 5 and the conductive element 31. The partition portion 3 is fixed to the control module 5, and is made of an insulating material. The partition portion 3 includes a base, and the base includes a first side portion 311 and a second side portion 312. The first side portion 311 faces toward the control module 5, and the second side portion 312 is faces away from the control module 5. At least part of the conductive element 31 is located between the first side portion 311 and the second side portion 312. The first side portion 311 faces toward the control module 5, and the base includes a plate portion 32. The plate portion 32 is arranged at least partially corresponding to an electric control board. The conductive element 32 includes a first conductive contact portion 311 and a second conductive contact portion 312. The first conductive contact portion 311 is fixed to the heating element 6, the second conductive contact portion 312 is electrically connected with the control module 5, and the second conductive contact portion is located at the plate portion. The partition portion 3 is made of the insulating material, which is advantageous for reducing the possibility of electric leakage of the control module 5 and other components and for improving the safety of the electric heater. The insulating material is a material that is non-conductive under an allowable voltage, but not an absolutely non-conductive material. A resistivity of the insulating material is within a range of 1010 to 1022 Ω·m. More specifically, the partition portion 3 is made of a polymer material such as nylon and plastic, or the partition portion 3 is made of an inorganic non-metallic material such as ceramic. The plate portion 32 is arranged at least partially corresponding to the electric control board, which is advantageous for isolating the other components from the control module 5 by the partition portion 3 and for improving the safety performance of the electric heater. The control module 5 is a control member for controlling the operation of the electric heater, which can receive a control signal from a vehicle control center, and can provide the control signal to a drive module of the electric heater after processing the signal, and can store operation parameters of the electric heater itself and feed them back to the vehicle control center. The vehicle control center in the present application may be a vehicle master control system or a vehicle air conditioning control system.

The electric heater 100 includes a first safety distance. The control module 5 includes a first electric control board body portion, the first electric control board body portion faces toward the partition portion 3, the first safety distance refers to a distance between the first side portion 311 of the partition portion and the first electric control board body portion, and the first safety distance is greater than 2 mm; or, the electric control board includes the first electric board body portion, the first electric control board body portion faces toward the partition portion, and the first side portion 311 of the partition portion is not in direct contact with the first electric board body portion. The first safety distance is set to be greater than 6 mm, or the first side portion 311 of the partition portion is not in direct contact with the first electric board body portion. On the one hand, air insulation is formed between the control module 5 and the partition portion 3, which is advantageous for the safety performance of the electric heater, and on the other hand, the first safety distance provides space for the electrical connection between the second conductive contact portion 312 and the control module 5.

The heating element 6 is a heating tube, and the heating tube 6 has advantages of a fast heating speed and the like. The base of the partition portion includes a bent portion 33. The plate portion 32 is integrally provided with the bent portion 33, and the bent portion 33 extends along the plate portion and is bent towards the heating tube 6. The first conductive contact portion 311 is located at the bent portion 33. The heating tube includes a contact portion 62, and the first conductive contact portion 311 is fixed to the contact portion 62 of the heating tube. The plate portion 32 is integrally provided with the bent portion 33, and the plate portion may be integrally injection-molded with the bent portion, which is relatively simple in process. The arrangement of the bent portion 33 is advantageous for reducing the possibility of electric leakage between part of the first conductive contact portion 311 and other members, and is advantageous for improving the safety of the electric heater 100. Specifically, the first conductive contact portion 311 is fixed to the contact portion 62 of the heating tube by welding, such that, when the electric heater 100 is supplied with a voltage, the conductive element 31 is electrically connected with the heating element 6.

The partition portion 3 includes a protruding portion 331 which is located at the bent portion 33. The electric heater 100 includes a fluid cavity 2, and the first conductive contact portion 311 is closer to the fluid cavity 2 than the protruding portion 331. The first conductive contact portion 311 includes a first top end, and the protruding portion includes a second top end 3311. In a direction perpendicular to the plate portion, the second top end 3311 is farther away from the plate portion 32 than the first top end. The first conductive contact portion 311 is closer to the fluid cavity 2 than the protruding portion 331, which is advantageous for reducing the possibility of electric leakage between the first conductive contact portion 311 and other members such as a second side wall 1211, thereby improving the safety performance of the electric heater 100. In the direction perpendicular to the plate portion, the second top end 3311 is farther away from the plate portion 32 than the first top end, which is advantageous for reducing the possibility of electric leakage between the first conductive contact portion 311 and other members such as a second housing 13, and is advantageous for improving the safety performance of the electric heater 100. The plate portion 32 and the bent portion 33 are made of polymer materials or inorganic non-metallic materials. On the one hand, the polymer materials or inorganic non-metallic materials have an insulating function, and on the other hand have a flame retardant function, which is conducive to the safety performance of electric heater 100.

The second conductive contact portion 312 is fixed to the control module 5 by welding. The partition portion 3 includes at least one contact groove 324, the contact groove 324 is located at the first side portion of the partition portion, and the conductive element 31 is partially located in the contact groove 324. The partition portion 3 includes at least one insertion hole 325, the insertion hole is located at the second side portion of the partition portion, the conductive element 31 is partially located in the insertion hole 325, and the contact groove 324 is arranged at least partially corresponding to the insertion hole 325 in position. The contact groove 324 has the same number as the insertion hole 325, and the contact groove 324 is in communication with the insertion hole 325. The arrangement of the contact groove 324 and the insertion hole 325, on the one hand, provides possibility for the electrical connection between a temperature fuse 249 and the conductive element 31 of the electric heater 100, and on the other hand, it is advantageous for fixing the temperature fuse 249.

The electric heater includes a cover body 24 and the temperature fuse 249. The cover body 24 includes a cover-body wall, and one side wall of the cover body 24 is defined as the cover-body wall. The cover body 24 is located between the fluid cavity 2 and the partition portion 3, and part of the cover body 24 is part of a wall portion forming the fluid cavity 2. The partition portion 3 is fixed to the cover body 24, and the temperature fuse 249 is located between the cover body 24 and the partition portion 3. The temperature fuse 249 includes a fixing portion, the fixing portion of the temperature fuse extends into the insertion hole 245, and the fixing portion of the temperature fuse is fixed to the conductive element 31, such that when the electric heater 100 is provided with a voltage, the temperature fuse 249 is electrically connected with the conductive element 31. The temperature fuse 249 has a function of protecting the circuit, and the temperature fuse 249 can avoid idle heating of the electric heater 100 and improve the safety performance and reliability performance of the electric heater 100. The conductive element 31 is electrically connected with the temperature fuse 249, thereby enabling the temperature fuse 249 to be electrically connected with the heating element 6. Moreover, an energized state of the temperature fuse 249 can affect an energized state of the heating element 6.

The electric heater includes the second side wall 1211 and a first side wall 1210, and at least part of the second side wall 1211 is not in contact with the first side wall 1210. The cover body 24 is in sealing arrangement with and fixed to the first side wall 1210. The contact portion 62 of the heating tube is located between the second side wall 1211 and the first side wall 1210, the first conductive contact portion 311 is located between the first side wall 1210 and the protruding portion 331, and the protruding portion 331 is located between the second side wall 1211 and the first side wall 1210, such that the first conductive contact portion 311 is not in contact with the first side wall 1210, and at least part of the second side wall 1211 is not in contact with the first side wall 1210, thus the electric heater 100 forms an installation space. The installation space includes a space between the second side wall 1211 and the first side wall 1210. The installation space can provide installation space for fixation of a strong electricity portion 71, a weak electricity portion 72 and the control module 5. The first conductive contact portion 311 is not in contact with the first side wall 1210, which relatively reduces the possibility of electric leakage between the first conductive contact portion 311 and the first side wall 1210.

The electric heater includes the strong electricity portion 71 and the weak electricity portion 72. The weak electricity portion 72 is at least partially located in an installation zone. The second side wall includes a protrusion portion 12111, the protrusion portion 12111 faces away from the fluid cavity, and the weak electricity portion 72 is arranged corresponding to the protrusion portion 12111. The protrusion portion 12111 includes a first portion 1211, a second portion 1211*b*, and a third portion 1211*c*. The second portion 1211*b* of the protrusion portion is located between the first portion 1211*a* of the protrusion portion and third portion 1211*c* of the protrusion portion. The installation zone includes a space formed by the first portion 1211*a*, the second portion 1211*b*, and the third portion 1211*c* of the protrusion portion.

The second portion 1211*b* of the protrusion portion is parallel to the first side wall 1210, the first portion 1211*a* of the protrusion portion is perpendicular to the first side wall 1210, and the third portion 1211*c* of the protrusion portion is perpendicular to the first side wall 1210. The strong electricity portion 71 is fixed to the second side wall 1211, the third portion 1211*c* of the protrusion portion is closer to the strong electricity portion 71 than the second portion 1211*b* of the protrusion portion, and the strong electricity portion is electrically connected with the control module and the heating element. The strong electricity portion 71 can be used to introduce an external strong voltage, and the external strong voltage is generally greater than or equal to 200 volts; the weak electricity portion can be used to introduce an external weak voltage, and the external weak voltage is generally less than or equal to 90 volts.

The electric heater 100 includes an adapter plate 721. The adapter plate 721 is electrically connected with the weak electricity portion 72, and the adapter plate 721 is electrically connected with the control module 5. The adapter plate 721 includes an adapter hole, a leading end and an adapter plate body 7211. The adapter hole is fixed to the weak electricity portion, the leading end protrudes from the adapter plate as a cantilever, and the leading end is fixed to the electric control board or the weak electricity portion. The weak electricity portion 72 may be electrically connected with the control module 5 through the adapter plate 721. The use of wires can be reduced through the weak electric plate 721, such that the structure of the electric heater 10) is simpler than that of the electric heater having wires.

In an embodiment, the heating element 6 is a heating tube, and the housing body 12 is integrally formed with the heating tube by casting. On the one hand, the structure is relatively simple in the production process; and on the other hand, the housing body 12 is integrally formed with the heating tube by casting, and at least part of the housing body 12 wraps outside the heating tube to provide a certain protective effect on the heating tube.

The electric heater includes an inlet 81 and an outlet 82. The inlet 81 and the outlet 82 are located on a same side of the electric heater 100, and the inlet 81 and the outlet 82 are located on the same side of the electric heater 100 as the strong electricity portion 71 and the weak electricity portion 72. The strong electricity portion 71 and the weak electricity portion 72 are located on a same side of the electric heater 100, and are easy to be connected with the strong voltage and the weak voltage in the vehicle. The inlet 81 and the outlet 82 are located on the same side of the electric heater 100, and are easy to be connected with an input portion and an output portion of the working medium in the vehicle.

Another technical solution is further provided according to the present application: an electric heater 100, capable of being used in situations where heating is required such as vehicles or other mobile devices, includes a first wall 121, a heating element 6, a heat transfer wall 122, and a cover body 24. The cover body 24 includes a cover-body wall, and one side wall of the cover body 24 is defined as the cover-body wall. The heat transfer wall 122 and the cover body 24 are fixedly connected or integrally formed with the first wall 121. The electric heater includes a fluid cavity 2, an inlet 81 and an outlet 82, and the fluid cavity 2 is in communication with the inlet 81 and the outlet 82. The heat transfer wall 122 includes a first side surface, the first wall and the first side surface of the heat transfer wall are part of the wall portion forming the fluid cavity, the first side portion 1221 of the heat transfer wall faces toward the fluid cavity 2, and a portion of the heating element 6 in contact with the heat transfer wall 122 is not in communication with the fluid cavity 2. The electric heater 100 includes a heat dissipation portion 244, the heat dissipation portion 244 is fixed to the cover body 24, the heat dissipation portion 244 protrudes from the cover body 24 to be a cantilever, and the heat dissipation portion 244 faces toward the fluid cavity 2. The electric heater 100 includes a drive module 4, and the drive module 4 is fixed to the cover body 24. The drive module 4 and the heat dissipation portion 244 are located on two sides of the cover body 24, and the drive module 4 is arranged in correspondence with at least part of the heat dissipation portion 244. The heat dissipation portion 244 and the drive module 4 are located on two sides of the cover body 24, the heat dissipation portion 244 and the drive module 4 are fixed to the cover body 24, and the heat dissipation portion 244 is arranged at least partially corresponding to the drive module 4 in position. When the electric heater is in operation, the heat dissipation portion 244 is located in the working medium, a temperature of the working medium 244 is lower than that of the drive module 4, and the heat dissipation section 244 can take away some of the heat generated by the drive module 4 by transferring the heat to the working medium, thereby relatively prolonging the service time of the drive module.

The electric heater 100 includes an inlet 211 of the fluid cavity and an outlet 231 of the fluid cavity. The inlet 211 of the fluid cavity is in communication with the inlet 81, and the outlet 82 of the fluid cavity is in communication with the outlet 82. Compared with the outlet 82 of the fluid cavity, the heat dissipation portion 244 is closer to the inlet 211 of the fluid cavity. The heat dissipation portion includes a free end 2441, and the free end 2441 of the heat dissipation portion is not in full contact with the heat transfer wall 122. Compared with a case where the free end of the heat dissipating portion is in full contact with the heat transfer wall, the free end portion 2441 of the heat dissipating portion being not in full contact with the heat transfer wall 122 is advantageous for reducing the flow resistance of the working medium and improving the heating efficiency of the electric heater 100.

The cover body 244 includes a strip-shaped protrusion 245, the strip-shaped protrusion 245 protrudes opposite to the fluid cavity 2, a position of the strip-shaped protrusion 245 is arranged partially corresponding to a position of the heat dissipation portion 244, and a position of the drive module 4 is corresponding to part of the strip-shaped protrusion 245. The drive module is an insulated gate bipolar transistor module or a metal-oxide semiconductor field effect transistor module. The strip-shaped protrusion 245 facilitates close contact of the drive module 4 with the cover body 24, and the strip-shaped protrusion 245 facilitates transferring the heat of the drive module 4 to the heat dissipation portion 244. In another embodiment, the electric heater 100 includes a heat conductive insulating element which is located between the drive module 4 and the cover body 24, and the heat conductive insulating element facilitates transferring the heat of the drive module 4 to the strip-shaped protrusion 245.

The electric heater includes a heat conducting portion 26 which is located between the heat transfer wall 122 and the cover body 24. The electric heater includes a first flow collecting zone 21, a second flow collecting zone 23 and a heating channel. The first flow collecting zone 21 communicates the inlet 211 of the fluid cavity with the heating channel, and the second flow collecting zone communicates the outlet 231 of the fluid cavity with the heating channel. The heat conducting portion 26 is advantageous for increasing a heating contact area of the working medium, thereby improving the heating efficiency of the electric heater 100.

The electric heater 100 includes a flow guiding portion 27 which is located between the cover body 24 and the heat transfer wall 122. Compared with the heat dissipation portion 244, the flow guiding portion 27 is closer to the inlet 211 of the fluid cavity than the heat dissipation portion 244. The flow guiding portion 27 includes a fixing portion 271 and a free end 272, and the flow guiding portion 27 is fixed to the cover body 24 or the heat transfer wall 122. The flow guiding portion 27 at least includes a first flow guiding surface 273, and the first flow guiding surface 273 has an angle with the inlet 211 of the fluid cavity. The first flow guiding surface 273 has an angle of 30 to 60 degrees with the inlet 211 of the fluid cavity.

In an embodiment, the fixing portion 271 of the flow guiding portion is fixed to the cover body 24, the free end 272 of the flow guiding portion is in contact with the heat transfer wall 122, the flow guiding portion includes a second flow guiding surface 274 and a third flow guiding surface 275, the first, second and third flow guiding surfaces are sequentially connected, the second flow guiding surface 274 has an angle with the third flow guiding surface 275, and the angle between the second flow guiding surface and the third flow guiding surface is less than 45 degrees.

In an embodiment, the fixing portion 271 of the flow guiding portion is fixed to the heat transfer wall 122, the free end 272 of the flow guiding portion is not in contact with the cover body 24, the flow guiding portion 27 includes a second flow guiding surface 274 and a third flow guiding surface 275, the first, second and third flow guiding surfaces are sequentially connected, the second flow guiding surface has an angle with the third flow guiding surface, and the angle between the second flow guiding surface and the third flow guiding surface is less than 45 degrees. The flow guiding portion 27 can guide the working medium and promote the uniform distribution of the working medium in the fluid cavity to a certain extent. Specifically, the working medium enters the fluid cavity through the inlet and reaches the first flow collecting zone. In a case that the flow guiding portion 27 is not provided, due to the dynamics of the working medium, a portion of the fluid cavity close to the inlet may have no working medium or little working medium. In order to avoid such a case, the flow guiding portion 27 is provided.

The heat dissipation portion 244 includes a fixing portion 2442 and a free end 2441. The heat dissipation portion extends from the fixing portion 2442 in a cylindrical or an oval column shape to the free end 2441 of the heat dissipation portion, which is relatively advantageous for reducing the resistance generated by the heat dissipation portion to the working medium.

The electric heater includes at least three heat dissipation portions 244, and two adjacent heat dissipation portions have a center distance. The center distance of two adjacent heat dissipation portions refers to a distance between centers of bottom surfaces of the fixing portions of the two adjacent heat dissipation portions. The center distance of two adjacent heat dissipation portions is 4 to 7 mm, and the number of the heat dissipation portions is 35 to 120, which, on the one hand, facilitates the heat dissipation of the drive module 4 to a certain extent, and on the other hand, facilitates relatively reducing the resistance generated by the heat dissipation portion 244 to the working medium.

The electric heater includes a first area, and the first area refers to a contact area between the drive module and the cover body or a projection area of the driving module to the cover body. The electric heater includes a second area, and the second area refers to an area of the heat dissipation portion not in contact with the cover body. A ratio of the second area to the first area is 3 to 4.5, which, on the one hand, facilitates the heat dissipation of the drive module 4 to a certain extent, and on the other hand, facilitates relatively reducing the resistance generated by the heat dissipation portion 244 to the working medium.

The heat dissipation portion is made of metal, the cover body is made of metal, and the heat transfer wall and the first wall are made of metal. The heat transfer wall is integrally formed with the first wall.

In an embodiment, the electric heater 100 includes a partition portion 3 and a control module 5, the partition portion 3 is at least partially located between the control module 5 and the cover body 24, the partition portion 3 is fixed to the cover body 24 and the control module 5, the electric heater 100 includes a conductive element 31, the conductive element 31 is electrically connected with the heating element 6 and the control module 5, and the partition portion 3 is made of an insulating material. In another embodiment, the electric heater 100 includes a circuit board 92, a partition portion 3 and a control module 5, the circuit board 92 and the fluid cavity 2 are located on two sides of the heating element 6, the partition portion 3 is located between the cover body 24 and the control module 5, the partition portion 3 is mode of an insulating material, and the circuit board 92 is electrically connected with the heating element 6 and the control module 5. The partition portion 3 being made of the insulating material is advantageous for avoiding the risk of electric leakage between the control module 5 and the cover body 24, and is thereby conducive to the safety performance of electric heater.

Another technical solution is further provided according to the present application: an electric heater 100, capable of being used in situations where heating is required such as vehicles or other mobile devices, includes a heat transfer wall 122, a heating element 6 and a heat conducting portion 26. The heat transfer wall 122 includes a first side surface 1221, the first side surface 1221 faces toward a fluid cavity 2, and the first side surface 1221 is part of a wall portion forming the fluid cavity. The heating element 6 is located on a side of the heat transfer wall 122 facing away from the fluid cavity 2, and a portion of the heating element 6 in contact with the heat transfer wall 122 is not in communication with the fluid cavity 2. The electric heater 100 includes the fluid cavity 2, an inlet 81 and an outlet 82, and the fluid cavity 2 is in communication with the inlet 81 and the outlet 82. The fluid cavity 2 includes an inlet 211 of the fluid cavity, an outlet 231 of the fluid cavity, a heating channel, a first flow collecting zone 21 and a second flow collecting zone 23. The first flow collecting zone 21a communicates the inlet 211a of the fluid cavity with the heating channel, the second flow collecting zone 23a communicates the heating channel with the outlet of the fluid cavity, and the first flow collecting zone 21a is in communication with the second flow collecting zone 23a. The heat conducting portion includes a first heat conducting portion 261a and a second heat conducting portion 262a, and the first heat conducting portion 261a is located between the second heat conducting portion 262a. A space between the first heat conducting portion 261a and the second heat conducting portion 262a and/or a space in front of the adjacent second heat conducting portion is part of the heating channel. The first and second heat conducting portions relatively increase a heating contact area of the working medium. Compared with a case where the heat conduction portion is not provided, providing the heat conduction portion is advantageous for increasing the efficiency of the electric heater.

The first flow collecting zone 21a is parallel to the second flow collecting zone 23a. The electric heater includes a first heating zone 29a and a second heating zone 210a. The heating channel has channel spacing, and the channel spacing at the first heating zone is greater than the channel spacing at the second heating zone. The first heating zone 29a is closer to the first flow collecting zone than the second heating zone 210. The first heat conducting portion 261a is located at the second heating zone 210a. Part of the second heat conducting portion 262a is located at the first heating zone 29a, and part of the second heat conducting portion 262a is located at the second heating zone 210. When the working medium flows from the first heating zone 29a to the second heating zone 210a, a section area of the heating channel is decreased, which facilitates the uniform heating for the working medium.

In another replacement mode, a flow section area of one end of the first flow collecting zone 21a away from the inlet 211a of the fluid cavity is smaller than a flow section area of the inlet 211a of the fluid cavity of the first flow collecting zone 21a, and a flow section area of one end of the second flow collecting zone 23a away from the outlet 231a of the fluid cavity is smaller than a flow section area of the outlet of the fluid cavity of the second flow collecting zone 23a. The flow section area of one end of the first flow collecting zone 21a away from the inlet 211a of the fluid cavity is smaller than the flow section area of the inlet 211a of the fluid cavity of the first flow collecting zone 21a, which is advantageous for reducing or avoiding the retention of the working medium at an end of the first flow collecting zone 21a away from the inlet 211a of the fluid cavity, and is conducive to the heating efficiency. The flow section area of one end of the second flow collecting zone 23a away from the outlet 231a of the fluid cavity is smaller than the flow section area of the outlet of the fluid cavity of the second flow collecting zone 23a, which is advantageous for reducing or avoiding the retention of the working medium at the end of the second flow collecting zone 23 away from the outlet 231a of the fluid cavity, and is conducive to the heating efficiency.

The first heat conducting portion 261a is spaced apart from the second heat conducting portion 262a. First and second forming surfaces are planes, and the forming surfaces are perpendicular to the first flow collecting zone and the second flow collecting zone. The first heat conducting portion 261a is parallel to the second heat conducting portion 262a. The first heating zone has a first channel spacing, the second heating zone has a second channel spacing, and the first channel spacing is greater than or equal to twice the second channel spacing, which facilitates the uniform heating for the working medium.

In another replacement mode, the first heat conducting portion 261a is not spaced apart from the second heat conducting portion 262a, the first forming surface is a plane, and the first forming surface is perpendicular to the first flow collecting zone 21a and the second flow collecting zone 23a. The second heat conducting portion includes a transition portion, and two adjacent second heat conducting portions are symmetrically arranged. The second heat conducting portion includes a first portion and a second portion, the transition portion is located between the first portion and the second portion, the first portion is located at the first flow collecting zone, and the second portion is located at the second flow collecting zone. The first portion includes two second forming surfaces symmetrical to each other, the second portion includes two third forming surfaces symmetrical to each other, the second and third forming surfaces are planes, and adjacent first, second and third forming surfaces are parallel to each other. The first, second and third forming surfaces are perpendicular to the first flow collecting zone. The first heating zone has a first channel spacing, the second heating zone has a second channel spacing, and the first channel spacing is greater than or equal to the second channel spacing and is smaller than twice the second channel spacing, which facilitates the uniform heating for the working medium.

Adjacent channel spacing between the first and second heat conducting portions of the first heating zone 29a is equal, and/or, adjacent channel spacing between the second heat conducting portions of the second heating zone 210a is equal, which facilitates the uniform flow of the working medium and the uniform heating for the working medium.

In another replacement mode, adjacent channel spacing between the first and second heat conducting portions (261b, 262b) of the first heating zone 29b is equal, adjacent channel spacing between the second heat conducting portions 262b is equal, and/or, adjacent channel spacing between the second heat conducting portions 262b of the second heating zone 210b is equal, which facilitates the uniform flow of the working medium and the uniform heating for the working medium.

Another technical solution is further provided according to the present application: an electric heater 100, capable of being used in vehicles, includes a heat transfer wall 122, a heating element 6 and a heat conducting portion 26. The heat transfer wall 122 includes a first side surface 1221, the first side surface 1221 faces toward a fluid cavity 2, and the first side surface 1221 is part of a wall portion forming the fluid cavity 2. The heating element 6 is located on a side of the heat transfer wall 122 facing away from the fluid cavity 2, and a portion of the heating element 6 in contact with the heat transfer wall 122 is not in communication with the fluid cavity 2. The electric heater 100 includes the fluid cavity 2, an inlet 81 and an outlet 82, and the fluid cavity 2 is in communication with the inlet 81 and the outlet 82. The fluid cavity includes an inlet 81 of the fluid cavity, an outlet 82 of the fluid cavity, a heating channel, a first flow collecting zone 21 and a second flow collecting zone 23. The first flow collecting zone 21 communicates the inlet 211 of the fluid cavity with the heating channel, the second flow collecting zone 23 communicates the heating channel with the outlet 231 of the fluid cavity, and the first flow collecting zone 21 is in communication with the second flow collecting zone 23. The heat conducting portion includes at least two first heat conducting portions 261, and a space between adjacent first heat conducting portions 261 is part of the heating channel. The heat conducting portions 261 relatively increase a heating contact area of the working medium. Compared with a case where the heat conduction portions 261 are not provided, providing the heat conduction portions 261 is advantageous for increasing the efficiency of the electric heater 100.

The first heat conducting portion 261 includes two forming surfaces symmetrical to each other, the forming surfaces are part of the wall portion forming the heating channel, and the forming surfaces are planes/curved surfaces. The forming surfaces have angles with the first flow collecting zone, and at least one of the forming surfaces has an angle of 0 to 90 degrees with the first follow collecting zone; and the forming surfaces have angles with the second flow collecting zone, and at least one of the forming surfaces has an angle of 0 to 90 degrees with the second follow collecting zone, which facilitates the uniform flow of the working medium and the uniform heating for the working medium.

The heating channel has channel spacing, adjacent first heat conducting portions 261 are parallel to each other, the electric heater includes a first heating zone 29 and a second heating zone 210, the first heating zone 29 has a first channel spacing, the second heating zone has a second channel spacing 210, the first channel spacing is greater than or equal to the second channel spacing, and the first heating zone 29 is closer to the first flow collecting zone than the second heating zone 210. In this way, in the first heating zone 29, a temperature difference between the working medium and the heat transfer wall 122 is relatively large; in the second heating zone 210, the temperature difference between the working medium and the heat transfer wall 122 is relatively small; and the first channel spacing is greater than or equal to the second channel spacing, and the residence time of the working medium in the first heating zone is greater than the residence time in the second heating zone, which facilitates the uniform heating for the working medium.

The electric heater 100 includes a third flow collecting zone 28, the third flow collecting zone 28 is parallel to the first flow collecting zone 21, the third flow collecting zone 28 is parallel to the second flow collecting zone 23, the third flow collecting zone 28 communicates the first heating zone 29 with the second heating zone 210, the third flow collecting zone 28 is in communication with the first flow collecting zone 21, and the third flow collecting zone 28 is in communication with the second flow collecting zone 23. In this way, after being heated by the first heating zone 29 and then mixed and shunted in the third flow collecting zone 28, the working medium enters the second heating zone 210 to continue to be heated, which facilitates the uniform heating for the working medium and is thereby conducive to the heating efficiency of the electric heater 100.

The first heat conducting portion 261/261a and the second heat conducting portion 262a are made of metal, the heat transfer wall 122 is made of metal, the heat transfer wall 122, the first heat conducting portion 261/261a and the second heat conducting portion 262a are integrally formed, which is relatively simple in structure.

The electric heater 100 includes a cover body 24 and a first wall 121, the cover body 24 is fixed to the first wall 121, the fluid cavity 2 and the heating element 6 are located on a same side of the cover body 24, and the heat conducting portion 26 is located between the heat transfer wall 122 and the cover body 24. The electric heater 100 includes a second side wall 1211, the first wall includes a first side wall 1210, and at least part of the second side wall 1211 is not in contact with the first side wall 1210. In the above technical solution, the electric heater 100 may include a first housing 11, a second housing 13, a housing body 12 and a protruding structure 116, the protruding structure 116 may be at least partially located between the first housing 11 and the housing body 12, and at least partially located between the second housing 13 and the housing body 12, the protruding structure 116 includes a fixing portion 1161 and a free end 1162, and the fixing portion 1161 of the protruding structure is fixed to the first housing 11 and/or the second housing 13 and/or the housing body 12. The protruding structure 116 keeps the first housing 11 at a certain distance from the housing body 12, and keeps the second housing 13 at a certain distance from the housing body 12. During installation, due to the presence of the protruding structure 116, the force between the first housing 11 and the housing body 12 is relatively uniform.

In an embodiment, the electric heater 100 includes a breather hole 9 which is located on the first housing 11. The breather hole 9 penetrates through the first housing 11, and the breather hole 9 is not in communication with the fluid cavity 2; or the breather hole 9 is located on the second housing 13, and the breather hole 9 penetrates through the second housing 13, and the breather hole 9 is not in communication with the fluid cavity 2; or the breather hole 9 is located on the housing body 12, the breather hole 9 penetrates through the housing body 12, and the breather hole 9 is not in communication with the fluid cavity 2. The breather hole 9 has a function of keeping the pressure inside the electric heater 100 consistent with the pressure outside the electric heater 100. The breather hole 9 is applied with a breather-hole film for relative sealing, which allows the air to pass through, but not the water or other medium. The breather-hole film is simple and convenient. In other embodiments, the breather holes may be sealed with sealing plugs. The sealing plug may be a rubber plug or the like, used for the sealing plug. The sealing plug also has a function of keeping the pressure inside the electric heater 100 consistent with the pressure outside the electric heater 100.

Specific embodiments are described below with reference to FIGS. 1 to 26. FIGS. 1 to 26 illustrate a first embodiment of the electric heater. The electric heater 100 includes a housing 1, a fluid cavity 2, a partition portion 3, a drive module 4, a control module 5, a heating element 6, a wiring portion 7, an inlet 81 and an outlet 82. The electric heater 100 powers the heating element 6 to generate heat and heat the working medium in the fluid cavity 2. The housing 1 includes a first housing 11, a housing body 12 and a second housing 13. The first and second housings are in sealing arrangement with and fixed to the housing body. The electric heater 100 includes an installation space, and the installation space includes a space formed by the first housing, the housing body and the second housing. The fluid cavity 2, the partition portion 3, the drive module 4, the control module 5 and the heating element 6 are located in the installation space. The partition portion 3, the drive module 4, the control module 5 and the heating element 6 are electrically connected. The control module 5 is used as a control component to control the operation of the electric heater, which can receive a control signal from the vehicle control center, and can provide the control signal to the drive module of the electric heater after processing the signal, and can store operation parameters of the electric heater itself and feed them back to the vehicle control center. The vehicle control center in the present application may be a vehicle master control system or a vehicle air conditioning control system.

Based on all embodiments, the electric heater 100 includes the heating element 6, the heat transfer wall 122 and the control module 5, where the electric heater includes the fluid cavity 2, the inlet 81 and the outlet 82, the fluid cavity 2 is in communication with the inlet 81 and the outlet 82, the heat transfer wall 122 is a part of the wall portion forming the fluid cavity 2, the heating element 6 is fixed or position-limited to at least part of the heat transfer wall 122, the heating element 6 is located outside the fluid cavity 2, and at least part of the heating element 6 is in contact with the heat transfer wall 122; and the cover-body wall of the electric heater 100 is another part of the wall portion forming the fluid cavity, the control module 5 is located outside the cover-body wall, the control module is located outside the fluid cavity 2 as well, and the control module 5 is electrically connected with the heating element 6.

The first side surface 242 of the cover-body wall faces toward the fluid cavity, the first side surface 242 of the cover-body wall is arranged face-to-face with the first side surface 1221 of the heat transfer wall, and the control module 5 is located on a back side of the first side surface 1221 of the cover-body wall. The first side surface 242 of the cover-body wall can be in direct contact with the working medium. The heating element 6 is not on the same side as the fluid cavity 2 relative to the first side surface 1221 of the heat transfer wall, so as to avoid direct contact of the heating element 6 with the working medium, thereby relatively avoiding the risk of electric leakage due to the rupture of the heating element 6 caused by the corrosion of the working medium. On the other hand, the control module 5 is located on the back side of the first side surface 1221 of the cover-body wall, the control module 5 is arranged on a side not in contact with the working medium, and the control module 5 is located outside the fluid cavity 2, which relatively reduces the influence of the heat generated by the heating element 6 on the control module 5 such as the damage of the control module 5 due to heat.

Figure 2:
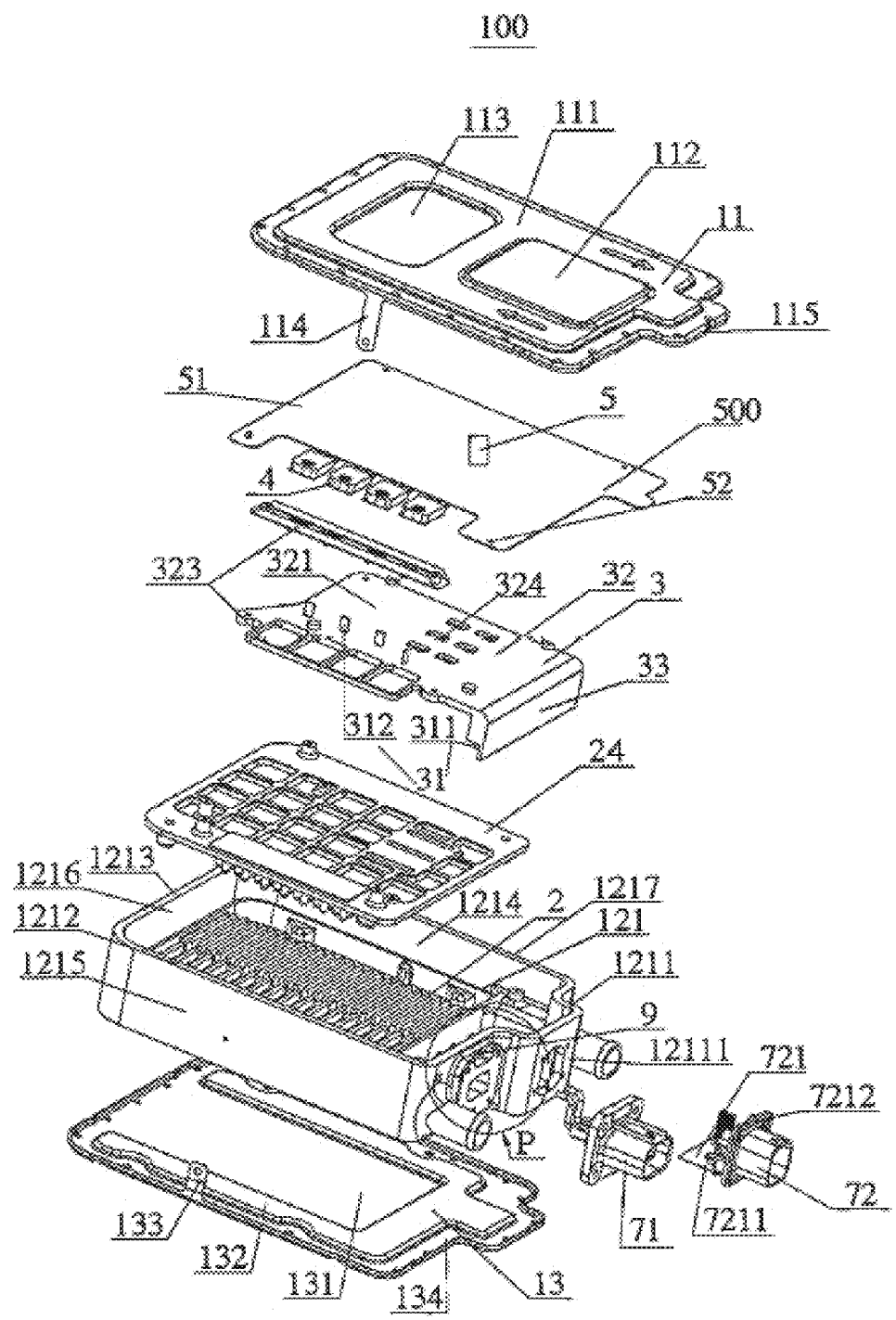
FIG. 2 is a schematic exploded view of a first embodiment of the electric heater shown in FIG. 1.
Figure 3:
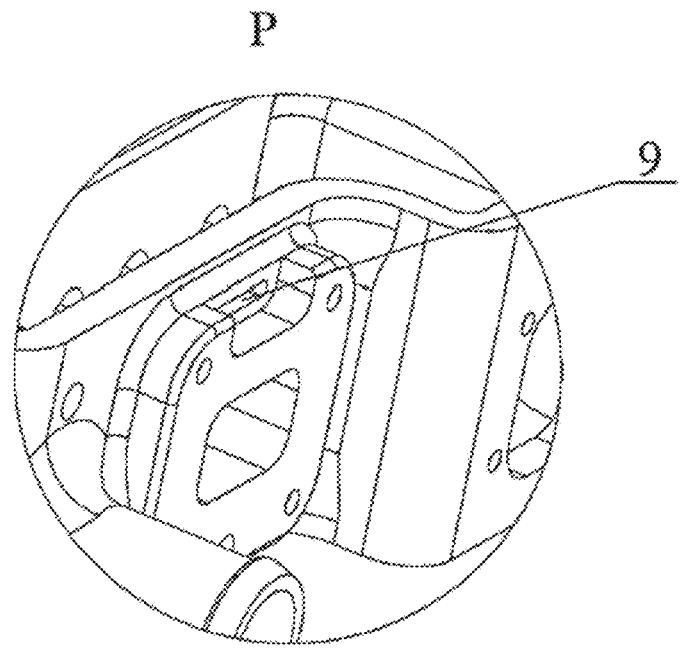
FIG. 3 is a schematic enlarged view of a portion P shown in FIG. 2.
Figure 4:
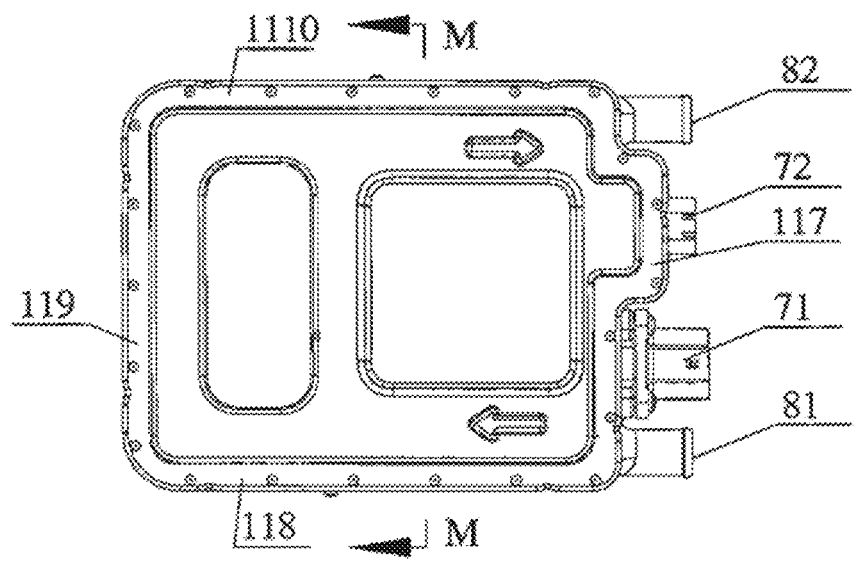
FIG. 4 is another schematic perspective view of the electric heater according to the present application.

Referring to FIGS. 1 and 2, the housing 1 includes the first housing 11, the housing body 12, and the second housing 13. The first and second housings may be formed by pressing metal materials and have the function of support and protection. Specifically, the first and second housings are formed by pressing aluminum. Since the density of aluminum is low, the present embodiment has the advantage of light weight in the case of a same volume. In the embodiment shown in FIGS. 1 to 26, the first and second housings are in sealing arrangement with and fixed to the housing body 12, respectively. The fixation here and in the following includes direct fixation and relative fixation. Direct fixation refers to that two components that need to be fixed are fixed to each other or are integrated with each other. For example, two or more components are fixed to each other by bolts, two or more components are fixed to each other by welding, two or more components are fixed to each other by their own structures (such as insertion) or other means, and two or more components are fixed by integral forming. The relatively fixation refers to that the components that need to be fixed can be fixed to an reference object to achieve the relative fixation of the components that need to be fixed. For example, two components are respectively fixed to the third component, such that the two components are relatively fixed. In this case, the third component is the reference object. In addition, the reference object may include more than one. The first housing 11 includes a first housing body 111, a first ridge portion 112, a first recessed portion 113, a first fixing portion 114 and a first edge portion 115, wherein the first ridge portion 112 protrudes in a direction away from the housing body, the first recessed portion 113 protrudes in a direction toward the housing body 12, and the first ridge portion 112 and the first recessed portion 113 help to increase the strength of the first housing 11. The first housing 11 and the housing body 12 can be relatively fixed through the first fixing portion 114, and the first edge portion 115 extends from the first housing body 111 and is bent toward the housing body 12. The first edge portion 115 can play a role of initial fixing in the mounting and fixing process of the first housing 11 and the housing body 12. Apparently, in other embodiments, the first housing may not include the first edge portion. Referring to FIGS. 2 to 12, the housing body 12 includes the first wall 121 and the heat transfer wall 122, and at least part of the heating element 6 is in contact with the heat transfer wall 122, where the contact arrangement includes direct contact arrangement and indirect contact arrangement. For example, at least part of the heating element 6 abutting against the heat transfer wall 122 is the direct contact arrangement. An intermediate heat conducting material such as a heat conducting film or a heat conducting sheet is provided between the heating element 6 and the heat transfer wall 122, at least part of the heating element 6 abutting against the intermediate heat conducting material and the intermediate heat conducting material abutting against the heat transfer wall is the indirect contact. The heat transfer wall 122 can transfer the heat generated by the heating element 6 to the working medium, and the heat transfer wall 122 cannot generate heat by itself. On the other hand, the heat transfer wall 122 separates the heating element 6 from the fluid cavity 2, or in other words, the heating element 6 is located outside the fluid cavity 2, or in other words, a zone of the heat transfer wall 122 where the heating element 6 is located is not in communication with the fluid cavity 2, or in other words, the heat transfer wall 122 prevents the direct contact of the heating element 6 with the fluid cavity 2. The heat transfer wall 122 is fixed to the first wall 121. Specifically, the heat transfer wall 122 is integrally formed with the first wall 121, the first wall 121 has an angle with the heat transfer wall 122, and the angle is greater than zero. Specifically, the first wall 121 is perpendicular to the heat transfer wall 122, where the perpendicular arrangement has a tolerance range of 0 to 10 degrees. The heat transfer wall 122 has a first side surface 1221, a second side surface 1222 and a groove 1223, the first side surface 1221 faces toward the first housing 12, at least part of the first side surface 1221 is part of the wall portion forming the fluid cavity, or in other words the first side surface 1221 of the heat transfer wall is in direct contact with the working medium while the electric heater 100 is in operation. The second side surface 1222 of the heat transfer wall faces away from the fluid cavity and faces toward the second housing 13, and when the electric heater 1222 is in operation, the second side surface 1222 can be in contact with the working medium. The groove 1223 is at least partially located between the first side surface 1221 and the second side surface 1222, or in other words most of the groove 1223 is located between the first side surface 1221 and the second side surface 1222, or in other words all the groove 1223 is located between the first side surface 1221 and the second side surface 1222. In this case, the groove 1223 is in a form of a through hole or a through channel. In a case that the heating element 6 is a heating tube, the groove 1223 provides a placement space for the heating tube. In other embodiments, the heating element is not the heating tube. For example, in a case that the heating element is PCT heating, the housing body 12 does not include the groove, and the heating element is located on a side of the second side surface of the heat transfer wall and is in contact with the second side surface of the heat transfer wall, or in a case that the heating element is an electric heat film, the electric heat film is attached to or formed on the second side surface of the heat transfer wall and is in contact with the second side surface of the heat transfer wall. When the heating element 6 is heated, the heat transfer wall 1221 transfers the heat radiated by the heating element 6 to the first side surface 1221 of the heat transfer wall, and the working medium is heated by the first side surface 1221. Apparently, the heat transfer wall 122 may transfer the heat to the first wall 121, and the first wall 121 may transfer the heat to the working medium. The second housing 13 includes a second housing body 131, a second ridge portion 132, a second fixing portion 133, and a second edge portion 134, the second ridge portion 132 faces toward the housing body 12, the second housing 13 and the housing body 12 can be fixed through the second fixing portion 133, and the second edge portion 134 extends from the second housing body 131 and is bent toward the housing body 12. The second edge portion 134 can play a role of initial fixing in the mounting and fixing process of the second housing 13 and the housing body 12.

Figure 5:
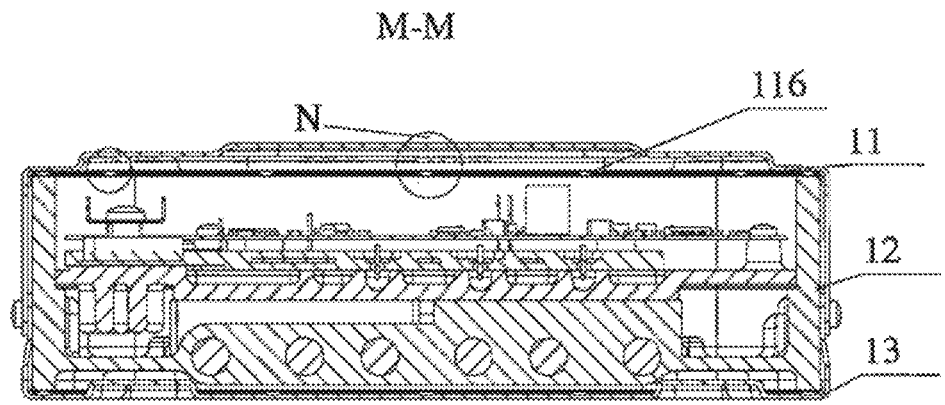
FIG. 5 is a schematic sectional view of the electric heater shown in FIG. 4 taken along line M-M.
Figure 6:
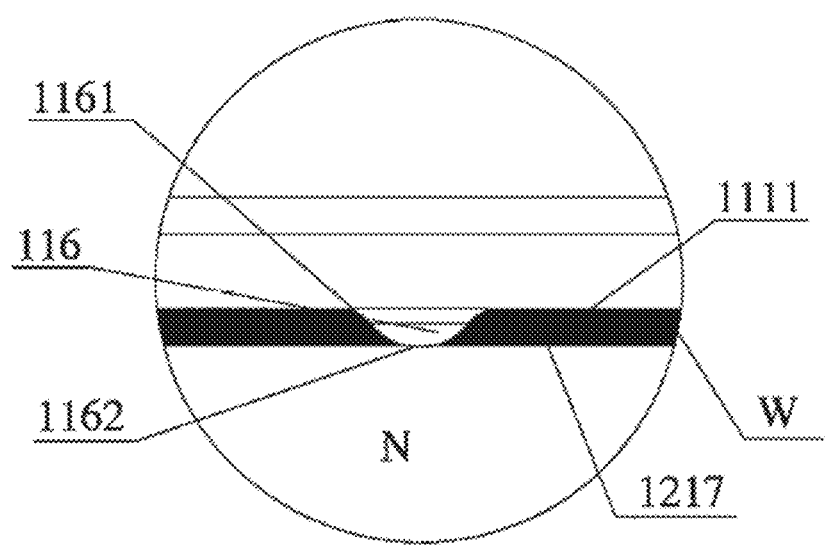
FIG. 6 is a schematic enlarged view of a portion N shown in FIG. 5.

The first housing 11 is in sealing arrangement with and fixed to the housing body 12, which enables the electric heater 100 to be waterproof and dustproof, or in other words, the first housing 11 is in sealing arrangement with and fixed to the housing body 12, and the second housing 13 is in sealing arrangement with and fixed to the housing body 12, which are advantageous for the waterproof and dustproof of the electric heater 100. Specifically, the electric heater 100 includes a sealing element W which is at least located between the first housing 11 and the housing body 12 and located between the second housing 13 and the housing body 12. Specifically, the sealing element W is made of a sealing material that is deformable according to the shape of the sealing surface, is not easy to flow, and has certain adhesiveness. More specifically, the sealing element W is a sealant. Referring to FIGS. 5 and 6, when the first housing 11 and the housing body 12 are installed and sealed, an excessive local pressure may be generated due to uneven installation force, and the sealing element W between the first housing 11 and the housing body 12 is extruded out, such that when the sealing element W is finally solidified, there is no sealing element W at a position where the pressure is too large, thereby causing a problem that the sealing effect cannot be achieved. In order to avoid the problem that there is no sealing element at the local position between the first housing 11 and the housing body 12, the electric heater 100 includes a protruding structure 116. The protruding structure 116 is located between the first housing 11 and the housing body 12, and/or located between the second housing 13 and the housing body 12. The protruding structure 116 includes a fixing portion 1161 and a free end 1162, the fixing portion 1161 of the protruding structure is fixed to at least one of the first housing 11, the second housing 13 and the housing body 12, and the free end 1162 of the protruding structure is in direct contact with at least one of the first housing 11, the second housing 13 and the housing body 12. A contact area between the fixing portion 1161 of the protruding structure and at least one of the first housing 11, the second housing 13 and the housing body 12 is defined as a first contact area, a contact area between the free end 1162 of the protruding structure and at least one of the first housing 11, the second housing 13 and the housing body 12 is defined as a second contact area, and the first contact area is greater than or equal to the second contact area, such that the contact effect can be enhanced, and the contact between the first housing and other housings is reliable. Specifically, during installation, due to the existence of the protruding structure 116, the force between the first housing 11 and the housing body 12 is relatively uniform, reducing the problem of local absence of the sealing element W due to the excessive local pressure. The protruding structure 116 is integrally formed with the housing 1. Specifically, the protruding structure 116 is integrally formed with at least one of the first housing 11, the housing body 12 and the second housing 13, which relatively simplifies the structure of elements. Referring to FIG. 6, the protruding structure 116 includes the fixing portion 1161 and the free end 1162, and the free end 1162 of the protruding structure is in contact with or abuts against the housing 1. Specifically, the fixing portion 1161 of the protruding structure is integrally formed with the first housing 11, and the freed end 1162 of the protruding structure is in contact with the housing body 12, or the fixing portion 1161 of the protruding structure is integrally formed with the housing body 12, and the free end 1162 of the protruding structure is in contact with the first housing 11. In the embodiment shown in FIGS. 2 to 8, the protruding structure 116 is integrally formed with the first housing 11. Specifically, the fixing portion 1161 of the protruding structure is integrally formed with the first housing 11, and the free end 1162 of the protruding structure is in contact with the housing body 12, such that there is a clearance between the first housing 11 and the housing body 12. When the first housing 11 and the housing body 12 are installed and sealed, the sealing element W is applied to the second housing 12, and the first housing 11 is fitted and pressed together with the housing body 12. During the process, the excess sealing element W is extruded and located between the first edge portion 115 and the housing body 12.

Figure 7:
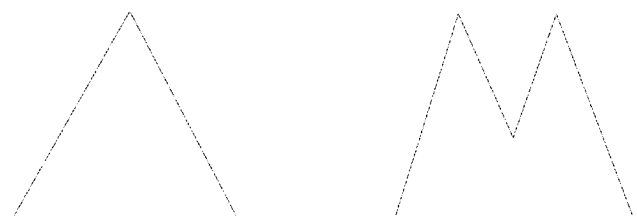
FIG. 7 is a schematic sectional view of an embodiment of a protruding structure.
Figure 8:
FIG. 8 is a schematic sectional view of another embodiment of the protruding structure.
Figure 9:
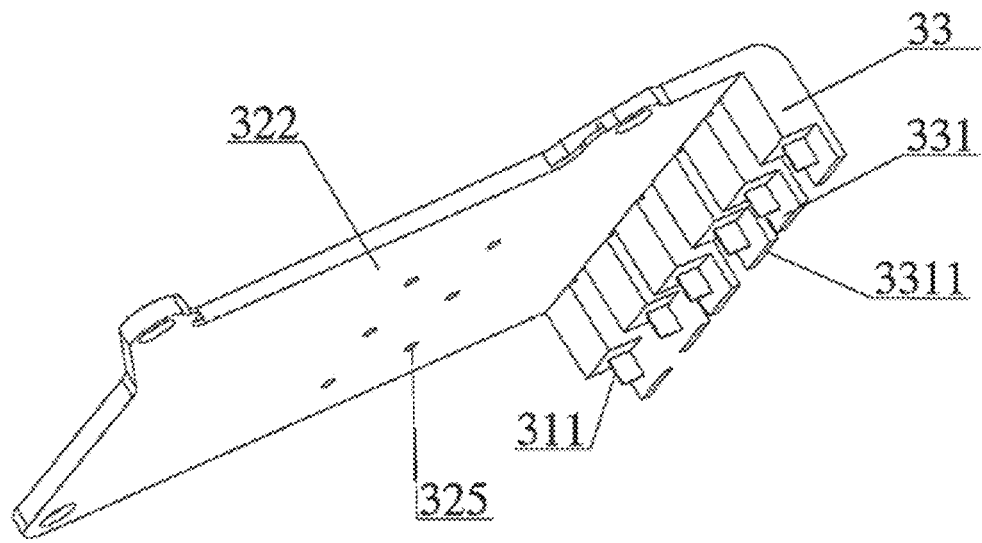
FIG. 9 is a schematic perspective view of a partition portion shown in FIG. 2 viewed from one direction.
Figure 10:
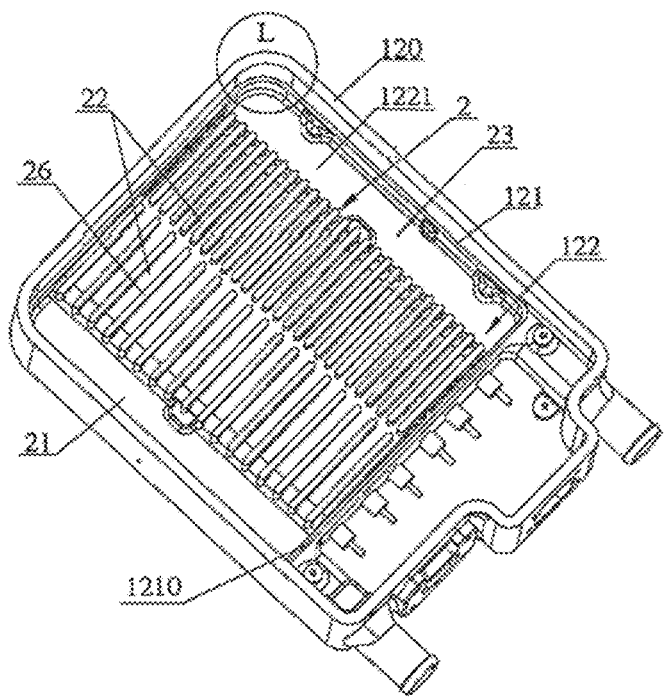
FIG. 10 is a schematic perspective view of a housing body and related portions shown in FIG. 2 viewed from one direction.
Figure 11:
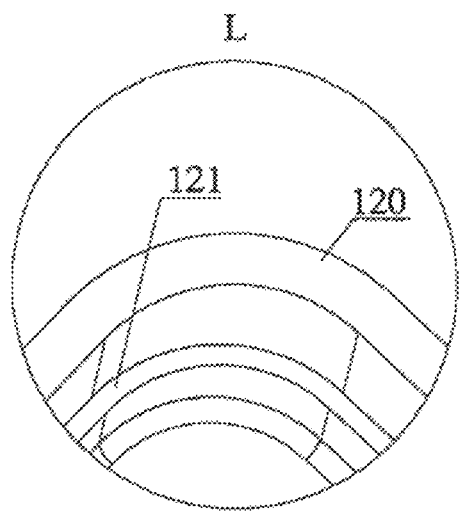
FIG. 11 is a schematic enlarged view of a portion L shown in FIG. 10.
Figure 12:
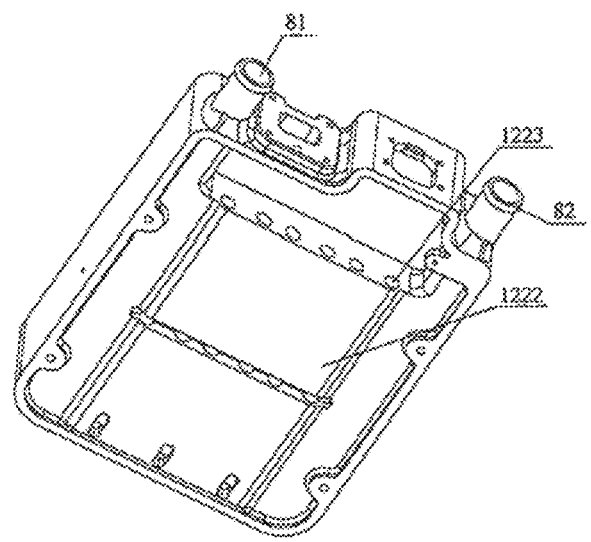
FIG. 12 is a schematic perspective view of the housing body and related portions shown in FIG. 2.
Figure 13:
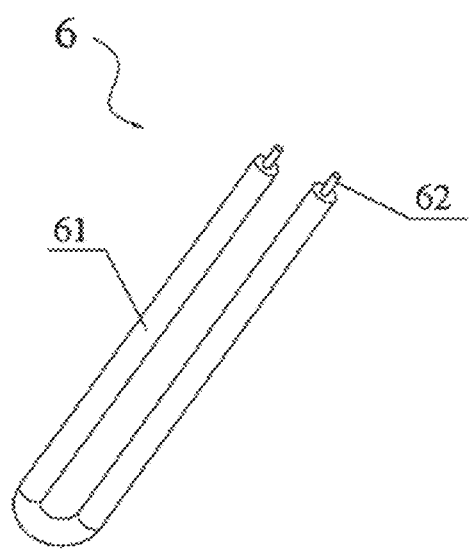
FIG. 13 is a schematic perspective view of a heating tube shown in FIG. 2.

The housing body 12 includes a second wall 120. Specifically, the second wall 120 is integrally formed with the first wall 121, and the second wall 120 can be in sealing arrangement with and fixed to the first housing 11. The housing body 12 includes a first sub-wall, that is, the second side wall 1211, a second sub-wall 1212, a third sub-wall 1213 and a fourth sub-wall 1214, the second side wall 1211 is arranged opposite to the third sub-wall 1213, and the second sub-wall 1212 is arranged opposite to the fourth sub-wall 1214. The second side wall 1211 is in sealing arrangement with and fixed to the strong electricity portion 71 and the weak electricity portion 72, or in other words, the second side wall 1211 is the strong electricity portion 71 and the weak electricity portion 72. The first housing 11 includes a first edge 117, a second edge 118, a third edge 119 and a fourth edge 1110. The first edge 117 corresponds to the second side wall 1211, the second edge 118 corresponds to the second sub-wall 1212, the third edge 119 corresponds to the third sub-wall 1213, and the fourth edge 1110 corresponds to the fourth sub-wall 1214. The protruding structure 116 is located on the first, second, third and fourth edges. Specifically, at least one protruding structure 116 is arranged on the first, second, third and fourth edges, respectively. When one protruding structure 116 is provided, the protruding structure 116 is substantially located at a middle position of the first, second, third and fourth edges. More specifically, in order to make the sealing effect better, at least three protruding structures 116 are respectively arranged on the first, second, third and fourth edges, where at least one protruding structure is located at the middle position of the first, second, third and fourth edges. Further, at least one protruding structure 116 is respectively provided on the first, second, third and fourth edges, and on the same edge, the adjacent protruding structures 116 are apart from each other by about 30 mm. The housing body 12 includes an outer side portion 1215, an inner side portion 1216 and a first sealing surface 1217. The first sealing surface 1217 is located between the outer side portion 1215 of the housing body and the inner side portion 1216 of the housing body and faces toward the first housing 11. The first housing 11 includes a second sealing surface 1111, the second sealing surface 1111 faces toward the housing body 12, and the protruding structure 116 is fixed to the second sealing surface 1111. The first sealing surface 1217 and the second sealing surface 1111 are collectively referred to as sealing surface. The protruding structure 116 is at least located between the first housing 11 and the housing body 12, and the sealing element W is at least located between the first sealing surface 1217 and the second sealing surface 1111. More specifically, the protruding structure 116 is at least located between the first sealing surface 1217 and the second sealing surface 1111. The protruding structure 116 is in contact with the sealing element W. and a circumferential side of the protruding structure 116 is in contact with the sealing element W. In the embodiment shown in FIG. 7, the fixing portion 1161 of the protruding structure is fixed to the second sealing surface 1111, and the free end 1162 of the protruding structure is in contact with the first sealing surface 1217. In other embodiments, the fixing portion of the protruding structure is fixed to the first sealing surface, and the free end of the protruding structure comes is in contact with the second sealing surface; or, the electric heater includes at least two protruding structures, part of the fixing portions of the protruding structures is fixed to the first sealing surface, and part of the free ends of the protruding structures is fixed to the second sealing surface. Specifically, the protruding structure is integrally formed with the second sealing surface, that is, the protruding structure 116 is integrally formed with the first housing 11. In other embodiments, the fixing portion of the protruding structure is fixed to the first sealing surface, that is, the protruding structure is integrally formed with the housing body, and the free end of the protruding structure is in contact with the second sealing surface; or the electric heater includes at least two protruding structures, part of the fixing portions of the protruding structures is fixed to the first sealing surface, that is, part of the protruding structures is integrally formed with the housing body, and part of the fixing portions of the protruding structures is integrally formed with the second sealing surface, that is, part of the protruding structures is integrally formed with the first housing. In the embodiment shown in FIG. 6, the free end 1162 of the protruding structure is in surface contact with the first sealing surface, and the protruding structure does not intersect with the outer side portion 1215 of the housing body and the inner side portion 1216 of the housing body at the same time. The outer side portion 1215 has two intersecting lines, a third boundary line and a fourth boundary line, with a first contact surface 1217, that is, the first sealing surface includes the third boundary line and the fourth boundary line. Specifically, the third boundary line is parallel to the fourth boundary line, a distance between the third boundary line and the fourth boundary line is defined as a second parallel distance, and the protruding structure 1116 does not intersect with the third boundary line and the fourth boundary line at the same time. Similarly, the second sealing surface includes a first boundary line and a second boundary line, and the protruding structure does not intersect with the first boundary line and the second boundary line at the same time. Specifically, the first boundary line is parallel to the second boundary line, and a distance between the first boundary line and the second boundary line is defined as a first parallel distance. Specifically, the protruding structure 116 is substantially in a round-table shape, the fixing portion 1161 of the protruding structure is a lower bottom surface of the round table, and the free end 1162 of the protruding structure is an upper bottom surface of the round table and is a curved surface. The free end 1162 of the protruding structure may be in single-sided contact or non-single-sided contact with the first sealing surface 1217, the non-single-sided contact refers to that an intersection portion of the free end 1162 of the protruding structure and the first sealing surface 1217 includes more than one surface. Referring to FIG. 7, FIG. 7 is a schematic sectional view of an embodiment of the protruding structure in point contact. In the embodiment shown in FIG. 7, the free end of the protruding structure is in point contact with the sealing surface, and the protruding structure 116 has a first contact area and a second contact area, where the first contact area refers to an area of an intersection portion of the fixing portion 1161 of the protruding structure and the second sealing surface, the second contact area refers to an area of an intersection portion of the free end 1162 of the protruding structure and the first sealing surface 1217, and the first contact area is greater than or equal to the second contact area. The protruding structure does not intersect with the outer side portion of the housing body and the inner side portion of the housing body at the same time. The contact area of the free end of the protruding structure is smaller than or equal to an area occupied by the fixing portion of the protruding structure. The point contact may be single-point contact or non-single point contact. The point contact refers to that a portion where the free end of the protruding structure intersects with the sealing surface is a point, the single-point contact refers to that the portion where the free end of the protruding structure intersects with the sealing surface is one point, and the non-single-point contact refers to that the portion where the free end of the protruding structure intersects with the sealing surface is two or more points. Referring to FIG. 8, FIG. 8 is a section view of an embodiment of the protruding structure in line contact. The free end of the protruding structure is in line contact with the sealing surface, and the protruding structure does not intersect with the outer side portion of the housing body and the inner side portion of the housing body at the same time. Specifically, a contact area of the free end of the protruding structure with a strip shape is smaller than or equal to the area occupied by the fixing portion of the protruding structure with a strip shape. Specifically, the protruding structure is in a strip shape, and the line contact refers to that the portion that the free end of the protruding structure intersects with the sealing surface is a line segment or a curve with a certain length, where the line contact may be single-line contact or non-single-line contact, the single-line contact refers to that the portion where the free end of the protruding structure intersects with the sealing surface is a line segment or a curve with a certain length, and the non-single-line contact refers to the portion where the free end of the protruding structure intersects with the sealing surface is two or more line segments or two or more curves with a certain length. The protruding structure has a height which refers to a vertical distance from the fixing portion of the protruding structure to the free end of the protruding structure. The height of the protruding structure is greater than or equal to 0.5 mm. Specifically, the height of the protruding structure may be between 0.5 mm and 2 mm. In order to ensure the sealing effect, the sealing element W has a width which refers to a smaller one of the first parallel distance and the second parallel distance, that is, if the first parallel distance is greater than the second parallel distance, the width of the sealing element is equal to the second parallel distance, and if the first parallel distance is smaller than the second parallel distance, the width of the sealing element is equal to the first parallel distance. The width of the sealing element is greater than or equal to 5 mm. Specifically, the width of the sealing element is between 5 mm and 10 mm.

The second housing 13 is in sealing arrangement with the housing body 12 as well. The sealing arrangement can play a role of waterproof and dustproof. Specifically, the sealing element W is arranged between the second housing 13 and the housing body 12. The sealing arrangement between the second housing 13 and the housing body 12 is similar to the sealing arrangement between the first housing 11 and the housing body 12.

In other embodiments, the sealing element W between the first housing and the housing body and the sealing element W the housing body and the second housing may be seal rings, the first housing may be fixed to the housing body by screws, and the housing body may be fixed to the second housing by screws.

A heating core of the electric heater 100 is the heating element 6. The electric heater 100 includes at least one heating element 6. The first side surface 1221 of the heat transfer wall faces toward the fluid cavity 2, and the heat transfer wall 122 is part of the wall portion forming the fluid cavity. The heating element 6 is located outside the fluid cavity 2. At least the heating element 6 is in contact with the heat transfer wall 1221. The heating element 6 and the fluid cavity 2 are located on different sides of the first side surface 1221 of the transfer heat wall. The control module 5 is located outside the fluid cavity, is located on a back side of the first side surface 242 of the cover-body wall, and is electrically connected with the heating element 6. The heating element 6 and the fluid cavity 2 are located on a same side of the cover body 24. Specifically, the heating element 6 is at least partially located between the first side surface 1221 of the heat transfer wall, that is, a bottom portion of the fluid cavity, and the second housing 13. More specifically, the heating element 6 may be a heating tube, a PCT, an electric heating film or the like. In the embodiment shown in FIGS. 1 to 28, the heating element 6 is a heating tube. The heating tube is at least partially fixed or position-limited between the first side surface 1221 of the heat transfer wall and the second side surface 1222 of the heat transfer wall. The contact portion 62 of the heating tube is at least partially located in the installation zone. The contact portion 62 of the heating tube is at least partially located between the second side wall 1211 and the first side wall 1210, and the contact portion 62 of the heating tube is fixed to the first conductive contact portion 311 by welding. The heating element 6 is at least partially located between the first side surface 1221 of the heat transfer wall and the second side surface 1222 of the heat transfer wall. Specifically, the heating element 6 is a U-shaped heating tube, where a coiled heating wire (resistance wire) is placed in a metal tube, and insulating powder with good heat resistance, thermal conductivity and insulation such as MgO is filled in the surrounding and gap portions, and two ends of the heating wire have lead rods or lead wires. The heating tube has the advantages of simple structure, high mechanical strength, safety and reliability, simple installation, long service life and so on. In other embodiments, the heating element may be a heating tube in other shapes such as an L-shaped tube. The heating element 6 may be connected with the housing body 12 by insert casting or welding to form a heat generating unit. Specifically, in the embodiment shown in FIGS. 1 to 28, the number of heating elements is three, at least parts of the heating elements 6 are located between the first side surface 1221 and the second side surface 1222 of the heat transfer wall, and at least parts of the heating elements 6 are located in the housing-body groove 1223. The heating element 6 includes a tube body 61 of the heating element and a contact portion 62 of the heating tube. At least parts of the tube bodies 61 of the heating elements are located in the housing-body groove 1223. The contact portion 62 of the heating tube is a lead wire portion of the heating element 6. The heating element 6 may be electrically connected with other components through the contact portion 62 of the heating tube. The heating element 6 is integrally formed with the housing body 12 by die casting, which avoids direct contact of the heating element 6 with the working medium, and reduces the safety risks such as electricity leakage and short circuit caused by tube wall defects of the heating element 6. Further, the heating tube is integrally formed with the housing body by die casting, thereby avoiding the occurrence of air and the like at a joint portion of the heating element and the housing body, relatively improving the heating condition of the heating element, and avoiding the occurrence of a local high temperature. In other embodiments, the heating element 6 is not integrally formed with the housing body, and the housing body has a groove. The heating element is at least partially located in the groove and fixed to the housing body. In the embodiment shown in FIG. 13, the contact portion 62 of the heating tube is flat. In other embodiments, the contact portion 62 of the heating tube is bent upward and/or downward.

In conjunction with FIGS. 2 to 12, the electric heater 100 includes the fluid cavity 2, the working medium can be heated in the fluid cavity 2, and the working medium may be a liquid or a gas-liquid mixture. The electric heater 100 includes the first flow collecting zone 21, a shunt zone 22, the second flow collecting zone 23, the cover body 24, the second wall 120, the heat conducting portion 26 and the fluid cavity. The fluid cavity 2 includes a space formed by the first side surface 1221 of the heat transfer wall, the cover body 24 and the first wall 1212. The cover body 24 includes the cover-body wall which is part of the wall portion forming the fluid cavity 2. One side wall of the cover body 24 is defined as the cover-body wall. The housing body 2 includes the first side wall 1210 and the second side wall 1211, the first side wall 1210 is fixedly connected to the second side wall 1211, the first side wall 1210 is fixed to the heat transfer wall 122, the first side wall 1210 is fixed to the cover-body wall, the first side wall 1210 intersects with the heat transfer wall 122, and the first side wall 1210 intersects with the cover-body wall. The second side wall 1211 is located outside the fluid cavity 2. The electric heater 100 further includes the installation zone, the installation zone includes a space between the first side wall 1210 and the second side wall 1211, such that the first side wall 1210 is not in contact with at least part of the second side wall 1221, and the installation zone is not in communication with the fluid cavity 2. The installation zone can provide placement space for at least part of the strong electricity portion 71 and the weak electricity portion 72 of the electric heater 100. And/or, one side wall of the cover body 24 is defined as the cover-body wall, and the fluid cavity 2 is at least located between the cover body 2 and the heat transfer wall 122. The heat transfer wall 122, the housing body 2 and the cover body 24 are fixedly connected or integrally formed. An end portion of the heating element 6 protrudes from the heat transfer wall 122, and the end portion of the heating element 6 is located in the installation zone formed by the two side walls of the housing body 2. The strong electricity portion 71 and the weak electricity portion 72 of the electric heater 100 are arranged in the installation zone, the weak electricity portion 72 is electrically connected with the control module 5, and the strong electricity portion 71 of the electric heater 100 is electrically connected with the heating element 6. The first flow collecting zone 21 and the second flow collecting zone 23 are located on two sides of the heat conducting portion 26, respectively. The first flow collecting zone 21, the shunt zone 22 and the second flow collecting zone 23 are in communication with each other, the first flow collecting zone 21 is in communication with the inlet 81, and the second flow collecting zone 23 is in communication with the outlet 82. The cover body 24 is in sealing arrangement with and fixed to the first wall 121. Specifically, the cover body is in sealing arrangement with and fixed to the first wall by welding; or the cover body is in sealing arrangement with the first wall through a sealing ring, and fixed to the first wall by bolts or screws; or the cover body is in sealing arrangement with and fixed to the second wall by a sealant. In other embodiments, the cover body is fixed to the first wall, or the cover body is fixed to the first wall and the second wall. The cover body 24 is in sealing arrangement with the first wall 121, which has a function of preventing the working medium from leaking from the cover body 24 to a certain extent. Specifically, the cover body 24 is in sealing arrangement with and fixed to the first wall 121 by welding, and the first wall 121 can be in direct contact with the working medium. Specifically, the first wall 121 is integrally formed with the housing body 12, and at least part of the first wall 121 is not in contact with the second side wall 1211. The first wall 121 includes the first side wall 1210, at least part of which is not in contact with the first wall 121.

Figure 14:
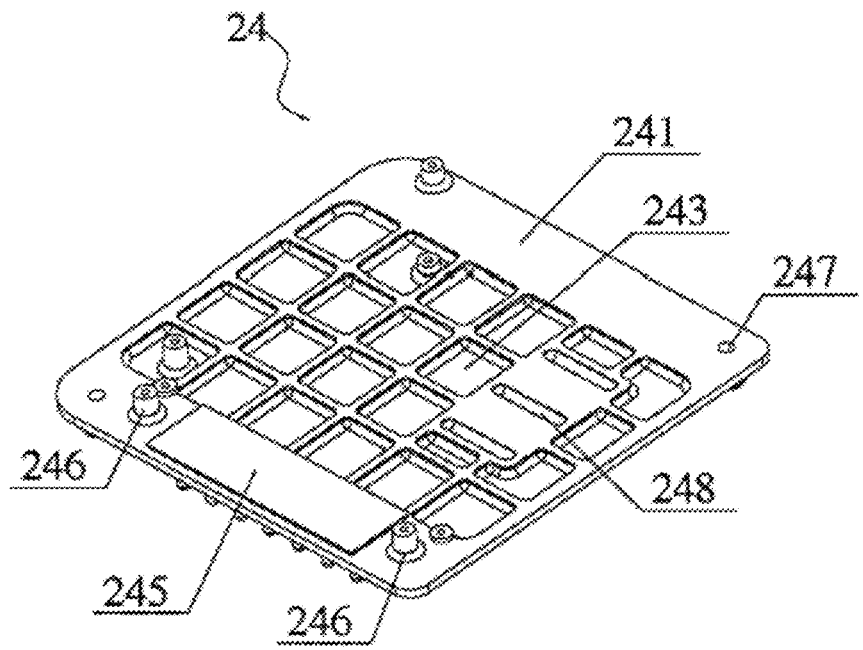
FIG. 14 is a schematic perspective view of a cover body shown in FIG. 2 viewed from one direction.
Figure 15:
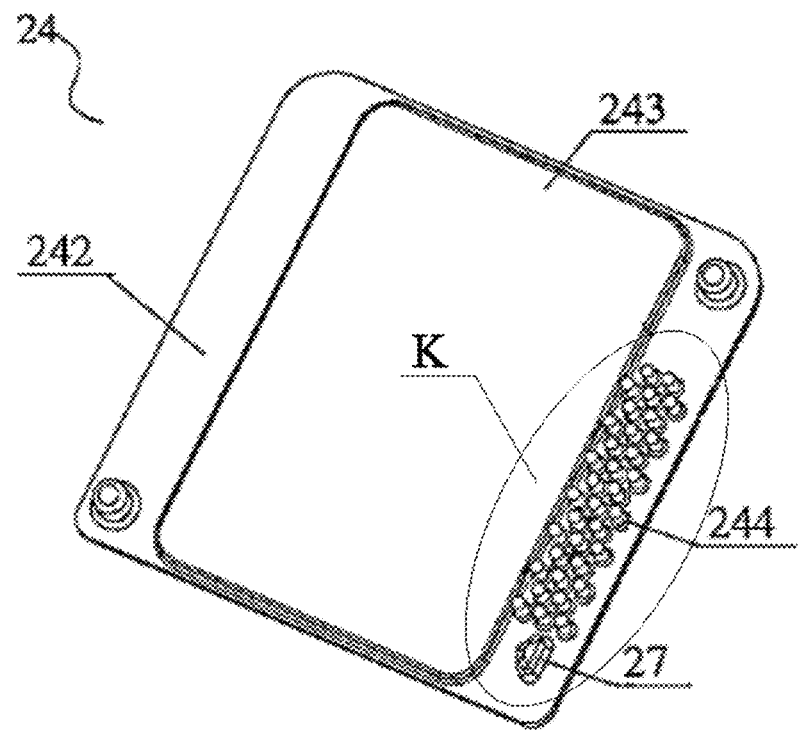
FIG. 15 is a schematic perspective view of the cover body shown in FIG. 2 viewed from another direction.

The electric heater 100 includes the heat conducting portion 26 which has a function of increasing the heating contact area of the working medium. The heat conducting portion 26 is located between the cover body 24 and the heat transfer wall 122. The heat conducting portion 26 is fixed to the heat transfer wall 122 or the heat conducting portion 26 is fixed to the cover body 24. The heat conducting portion 26 and the partition portion 3 are located on two sides of the cover body 24, and the heat conducting portion 26 and the fluid cavity 2 are located on a same side of the cover body 24. Specifically, the heat conducting portion 26 is integrally formed with the housing body 12. Referring to FIGS. 14 and 15, the cover body 24 includes the cover-body wall, the second side surface 241 of the cover-body wall, the first side surface 242 of the cover-body wall, a protruding portion 243, the heat dissipation portion 244, the strip-shaped protrusion 245, a third fixing portion 246, a fourth positioning position 247, a mounting groove 248 and the temperature fuse 249. The second side surface 241 of the cover-body wall faces away from the fluid cavity and faces toward the first housing 11, and the first side surface 242 of the cover-body wall faces toward the fluid cavity and faces away from the first housing 11. The protruding portion 243 protrudes toward the fluid cavity, and the protruding portion 243 at least partially abuts against the heat conducting portion 26. The strip-shaped protrusion 245 is located on the second side surface 241 of the cover-body wall and protrudes toward the first housing 11. The strip-shaped protrusion 245 is in cooperation with the drive module 4, or in other words, the strip-shaped protrusion 245 is arranged corresponding to a position of the drive module 4. The third fixing portion 246 is located on two sides of the strip-shaped protrusion, and the fourth positioning portion 247 is in cooperation with the partition portion. The heat dissipation portion 244 is located on the first side surface 242 of the cover-body wall and protrudes toward the fluid cavity 2 and the heat transfer wall 122. The temperature fuse 249 is at least partially located in the mounting groove 248. In other embodiments, the mounting groove is located in the partition portion, and the temperature fuse is at least partially located in the mounting groove.

Figure 20:
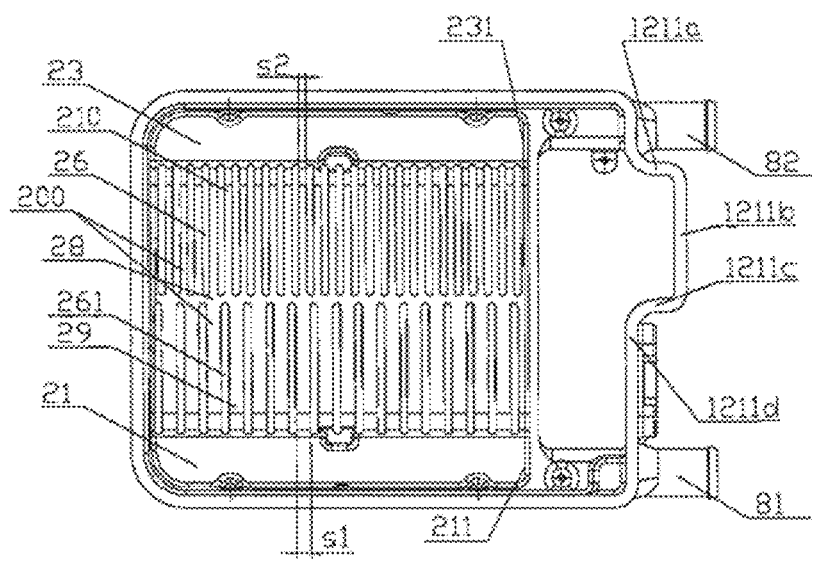
FIG. 20 is a schematic perspective view of a first embodiment of a heat conducting portion and related portions.
Figure 24:
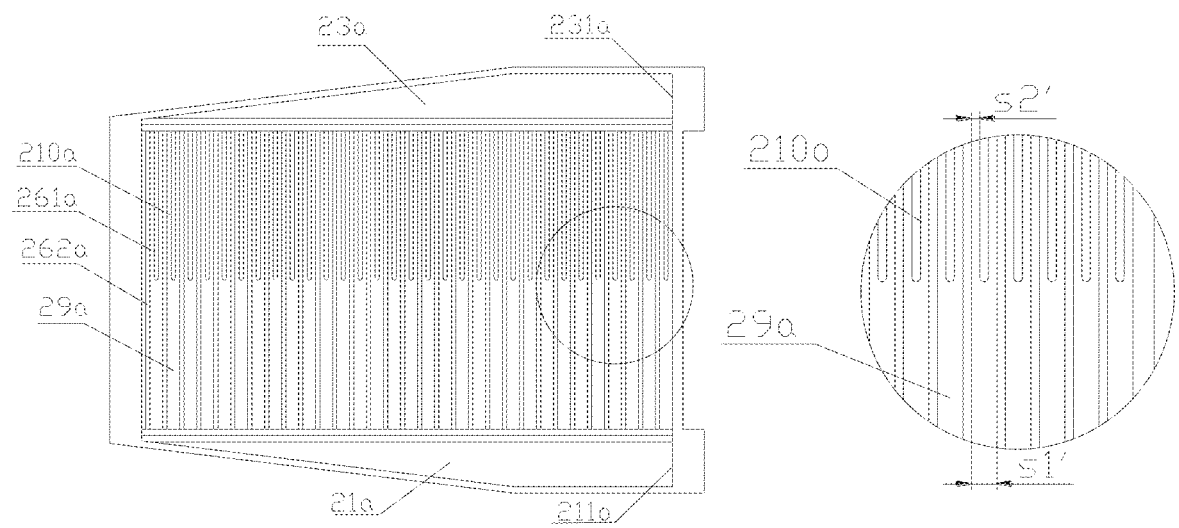
FIG. 24 shows a schematic perspective view and a partially enlarged view of a fourth embodiment of the heat conducting portion and related portions.
Figure 25:
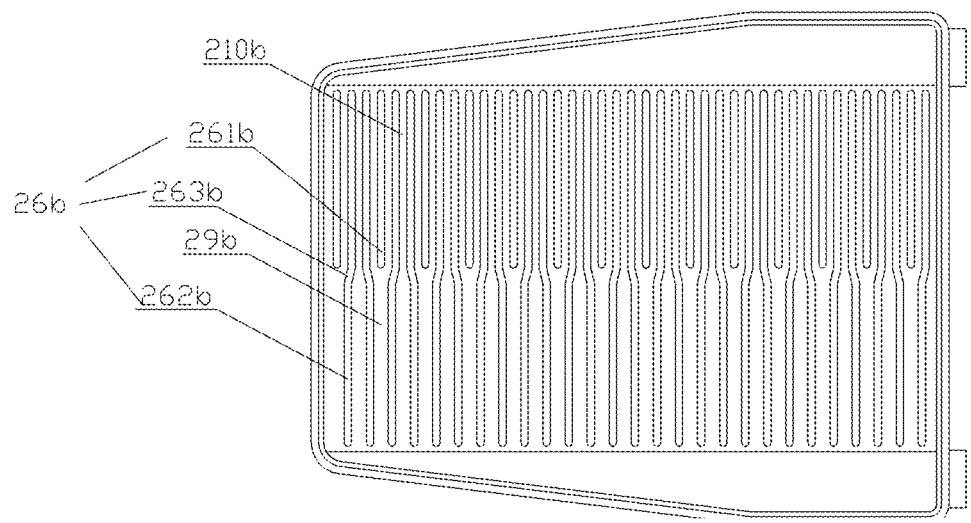
FIG. 25 is a schematic perspective view of another embodiment of the fourth embodiment of the heat conducting portion and related portions.

The heat conducting portion 26 protrudes from the heat transfer wall 122. The heat conducting portion 26 is located between the heat transfer wall and the cover body 24. The heat conducting portion 26 and the fluid cavity 2 are located on a same side of the cover body 24. The heat conducting portion 26 is integrally formed with or fixed to the heat transfer wall 122. The material of the heat conducting portion 26 is the same as or different from that of the heat transfer wall. In order to facilitate heat transfer, the heat conducting portion 26 is made of metal or an alloy with good thermal conductivity, for example, aluminum. On the one hand, the heat conducting portion 26 can transfer the heat of the heating element 6 to the working medium, which relatively increases the heat transfer area and is advantageous for improving the heat transfer efficiency; and on the other hand, the heat conducting portion is advantageous for reducing the working temperature of the heating element 6, improving the working conditions of the heating element 6, and prolonging the working time of the heating element. The heat conducting portion 26 includes a heat conducting unit. Referring to FIG. 20, the heat conducting unit includes a first heat conducting portion 261. Referring to FIG. 24, the heat conducting unit includes a first heat conducting portion 261a and a second heat conducting portion 262a. Referring to FIG. 25, the heat conducting unit includes a first heat conducting portion 261b, a second heat conducting portion 262b and a third heat conducting portion 263b. Referring to FIG. 20, the inlet 81 and the outlet 82 are located on a same side of the electric heater. Apparently, the inlet and the outlet may be located on different sides of the electric heater. The electric heater 100 includes the first flow collecting zone 21, the second flow collecting zone 23, the third flow collecting zone 28 and the heat conducting portion 26. The first flow collecting zone 21 communicates the inlet 211 of the fluid cavity with the heating channel, the second flow collecting zone 23 communicates the outlet 231 of the fluid cavity and the heating channel 200), the first flow collecting zone 21 is in communication with the second flow collecting zone 23 at least through the heating channel 200, and the electric heater 100 includes the heat conducting portion 26 which is located between the first side surface 1211 of the heat transfer wall and the first side surface 242 of the cover-body wall; or in other words, the electric heater 100 includes the first flow collecting zone 21, the second flow collecting zone 23, the heating channel 200, the inlet 211 of the fluid cavity and the outlet 231 of the fluid cavity, where the first flow collecting zone 21 communicates the inlet 211 of the fluid cavity with the heating channel 200, the second flow collecting zone 23 communicates the outlet 231 of the fluid cavity with the heating channel 200, the first flow collecting zone 21 is in communication with the second flow collecting zone 23, the electric heater 100 includes the heat conducting portion 26, the heat conducting portion 26 is located between the first side surface 1211 of the heat transfer wall and the first side surface 242 of the cover-body wall, the electric heater 100 (includes the third flow collecting zone 28, the first flow collecting zone 21 is in communication with the third flow collecting zone 28 at least through part of the heating channel 200, the third flow collecting zone 28 is in communication with the second flow collecting zone 23 through part of the heating channel 200, and the first flow collecting zone 21 is in communication with the second flow collecting zone 23 through the third flow collecting zone 28. The first flow collecting zone 21 and the second flow collecting zone 23 are located on opposite sides of the heat conducting portion 26, and the first flow collecting zone 21 is in communication with the second flow collecting zone 23. The heat conducting portion 26 includes at least two first heat conducting portions 261, and the adjacent first heat conducting portions 261 are not in contact with each other. A space between the adjacent first heat conducting portions 261 is part of the heating channel 200. The electric heater 100 includes the inlet 211 of the fluid cavity and the outlet 231 of the fluid cavity. The inlet 211 of the fluid cavity is located in the first flow collecting zone 21 and is the inlet of the fluid cavity. The outlet 231 of the fluid cavity is located in the second flow collecting zone and is the outlet of the fluid cavity. The inlet 211 of the fluid cavity is in communication with the inlet 81, the outlet 231 of the fluid cavity is in communication with the outlet 82, the working medium enters the fluid cavity 2 through the inlet 211 of the fluid cavity, and is collected and shunted at the first flow collecting zone 21. After being shunted, the working medium converges again at the second flow collecting zone 23. The adjacent first heat conducting portions 261 are parallel to each other, where the parallel arrangement has an error range of 0 to 10 degrees. The heating channel has channel spacing, at least some or all of the adjacent heat conducting portions have equal channel spacing. In the present embodiment, the channel spacing is an equivalent distance between the first heat conducting portion 261 and the second heat conducting portion of the heat conducting portion 26 which are adjacent to each other; or, the equivalent distance refers to an average distance between projections of the adjacent first heat conducting portions projected onto the heat transfer wall; or in other words, the channel spacing refers to an equivalent distance between the adjacent heat conducting units which refers to an average distance between the projections of the adjacent heat conducting units projected onto the heat transfer wall. The electric heater 100X) includes the first heating zone 29 and the second heating zone 210, the first heating zone 29 has a first channel spacing s1, the second heating zone 210 has a second channel spacing s2, and the first channel spacing s1 is greater than the second channel spacing s2. The first heating zone 29 is located between the first flow collecting zone 21 and the second heating zone 23, and the second heating zone 23 is located between the first heating zone 29 and the second flow collecting zone 23. In a case that each adjacent first heat conducting portions in the first heating zone 29 have equal channel spacing, the first channel spacing s1 is equal to the equivalent distance between any adjacent first heat conducting portions in the first heating zone 29. In a case that each adjacent first heating conducting portions in the first heating zone 29 have different channel spacing, the first channel spacing s1 refers to a minimum value of the equivalent distance between the adjacent first heat conducting portions in the first heating zone. Similarly, in a case that each adjacent first heat conducting portions in the second heating zone 210 have equal channel spacing, the first channel spacing s1 is equal to the equivalent distance between any adjacent first heat conducting portions in the second heating zone 210. In a case that each adjacent first heating portions in the second heating zone 210 have different channel spacing, the first channel spacing s1 refers to a minimum value of the equivalent distance between the adjacent first heat conducting portions in the first heating zone. The first channel spacing s1 is greater than the second channel spacing s2, and the first heating zone 29 is closer to the first flow collecting zone than the second heating zone 210. Specifically, the first channel spacing s1 is greater than twice the second channel spacing (a thickness of the first heat conducting portion itself is not ignored here). In the first heating zone 29, the temperature of the working medium close to the inlet 211 of the fluid cavity is relatively low, and in a case that the temperature of the heating element 6 is the same, the heat transfer effect is better when a temperature gradient is larger, such that the first channel spacing s is large in the first heating zone. In the second heating zone 210, because the working medium is close to the outlet 23 of the fluid cavity, the temperature gradient is decreased after the working medium is heated by the first heating zone, the heat transfer effect is relatively decreased, the second channel spacing is small, and the heat transfer area is relatively larger, which is conducive to the heat transfer effect. Different channel spacing in the first heating zone 29 and the second heating zone 210 helps to make the temperature distribution of the working medium in the fluid cavity uniform and avoid local high temperature. In the first heating zone 29, the adjacent first heat conducting portions have equal channel spacing, and/or, in the second heating zone 210, the adjacent first heat conducting portions have equal channel spacing. The electric heater 100 includes the third flow collecting zone 28, the third flow collecting zone 28 is located between the first flow collecting zone 21 and the second flow collecting zone 23, and the third flow collecting zone 28 is in communication with the first flow collecting zone 21 and the second flow collecting zone 23. After being heated by the first heating zone, the working medium is mixed and shunted in the third flow collecting zone, and then enters the second heating zone and continues to be heated. In order to mix the working medium more completely in the third flow collecting zone, the first heat conducting portion located in the second heating zone 29 is extended from one end close to the second heating zone 210 along a direction in which the first heating zone is directed to the second heating zone, to form a protruding portion, and the protruding portion is not completely overlapped with the first heat conducting portion located in the second heating zone.

The first flow collecting zone 21 is parallel to the second flow collecting zone 23, and the parallel arrangement herein has an error range of 0 to 10 degrees. One end of the first flow collecting zone 21 away from the inlet 211 of the fluid cavity has an acute bending portion or a smooth bending portion, that is, a flow section area of the first flow collecting zone 21 away from the inlet portion is smaller than a flow section area of the inlet 211 of the fluid cavity in the first flow collecting zone, which is advantageous for avoiding the generation of a dead angle zone of the working medium. Similarly, one end of the second flow collecting zone 23 away from the outlet of the fluid cavity has an acute bending portion or a smooth bending portion, that is, the flow section area of the second flow collecting zone 23 away from the outlet of the fluid cavity is smaller than the flow section area of the outlet of the fluid cavity in the second flow collecting zone.

The first heat conducting portion 261 includes two symmetrical forming surfaces which are planar or curved surfaces. The two symmetrical forming surfaces allow the heating areas on the two forming-surface sides of the first heat conducting portion 261 to be roughly the same or close, which facilitates the uniform distribution of the temperature of the working medium. The first heat conducting portion 261 includes two symmetrical forming surfaces which are planar. The "planar" herein includes a case of non-planar due to a manufacturing process error range, and the two symmetrical forming surfaces are parallel to each other. The parallel arrangement herein has an error range of 0 to 10 degrees. The forming surfaces of adjacent first heat conducting portions are also parallel to each other. The first heat conducting portion is perpendicular to the first flow collecting zone and the second flow collecting zone. The vertical arrangement herein has an error range of 0 to 10 degrees. Apparently, in other embodiments, the heat conducting portion 26 includes the second heat conducting portion which has substantially the same shape as the first heat conducting portion, the second heat conducting portion is different in size from the first heat conducting portion, the first heat conducting portion is located in the first heating zone, and the second heat conducting portion is located in the second heating zone.

Figure 22:
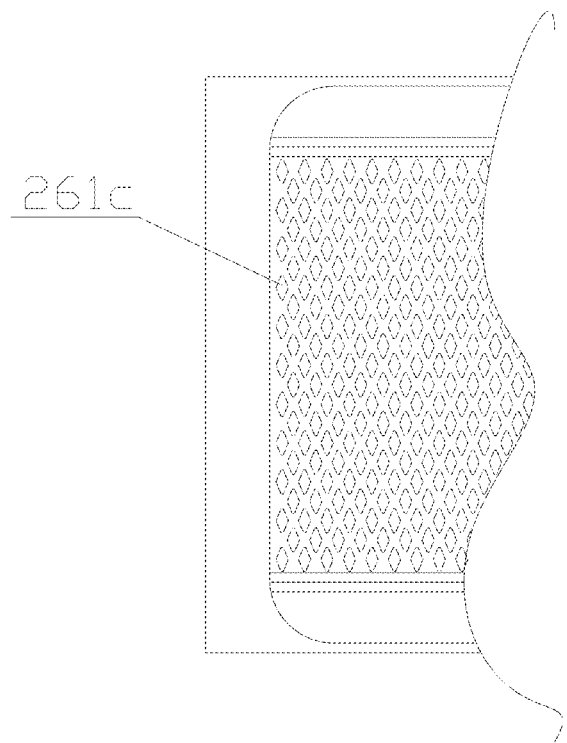
FIG. 22 is a schematic perspective view of a second embodiment of the heat conducting portion and related portions.

Referring to FIG. 22, FIG. 22 shows a second embodiment of the heat conducting portion and associated portions. An electric heater includes a first heat conducting portion 261c. The first heat conducting portion 261c includes two parallel forming surfaces, at least one of the two parallel forming surfaces has an angle with the first flow collecting zone and the second flow collecting zone, and the angle is greater than 0 degrees and less than 90 degrees.

Figure 23:
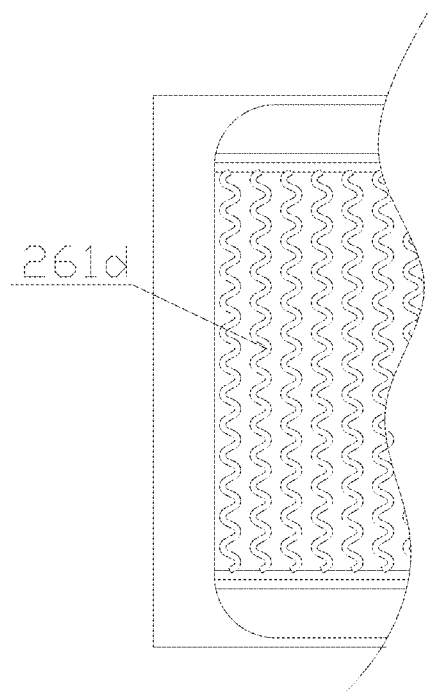
FIG. 23 is a schematic perspective view of a third embodiment of the heat conducting portion and related portions.

Referring to FIG. 23, FIG. 23 shows a third embodiment of the heat conducting portion and associated portions. An electric heater includes a first heat conducting portion 261d. The first heat conducting portion 261d includes peaks and troughs, the peaks and the troughs are arranged alternately, the peaks of the adjacent first heat conducting portions are correspondingly arranged, and the channel spacing between the adjacent first heat conducting portions 261d may be the same or different.

Figure 21:
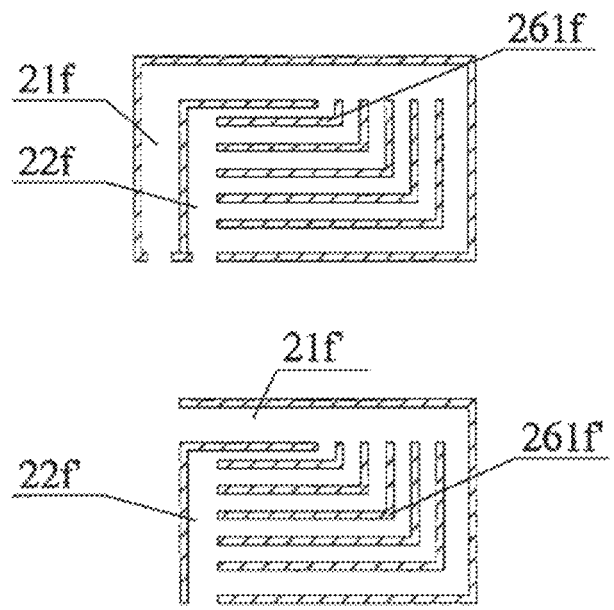
FIG. 21 is a schematic perspective view of another embodiment of the heat conducting portion and related portions.

Referring to FIG. 21, the inlet and the outlet are located on a same side or on different sides of the electric heater. The first flow collecting zone intersects with the second flow collecting zone, or part of the first flow collecting zone is parallel to part of the second flow collecting zone, and part of the first flow collecting zone intersects with part of the second flow collecting zone. The intersection arrangement herein refers to non-parallel arrangement (the parallel arrangement has an error range of ±10 degrees). A first heat conducting portion 261f extends from a first flow collecting zone 21f to a second flow collecting zone 22f, and the first heat conducting portion 261f has a bending portion. Specifically, the first heat conducting portion 261f is substantially L-shaped, the adjacent first heat conducting portions 261f are not in contact with each other, the first heat conducting portion 261f extends from the first flow collecting zone 21f to the second flow collecting zone 22f, and the first heat conducting portion 261f has a bending portion. Specifically, the first heat conducting portion 261r is substantially L-shaped, and the adjacent first heat conducting portions 261f are not in contact with each other.

Referring to FIG. 24, FIG. 24 shows that, a heat conducting portion 26a includes a first heat conducting portion 261a and a second heat conducting portion 262a, the first heat conducting portions 261a are located between the second heat conduction portions 262a, the adjacent heat conducting portions 26a are not in contact with each other, a space between the adjacent heat conducting portions is part of the heating channel, and the first heat conducting portion 261a and the second heat conducting portion 262a extend from a first flow collecting zone 21a to a second flow collecting zone 22a. The first flow collecting zone 21a and the second flow collecting zone 23a have the same arrangement as the first flow collecting zone 21 and the second flow collecting zone 23 in the embodiment shown in FIG. 24. The electric heater further includes an inlet 211a of the fluid cavity and an outlet 231a of the fluid cavity, and the inlet 211a of the fluid cavity and the outlet 231a of the fluid cavity are located in the first flow collecting zone 21a and the second flow collecting zone 231a, respectively. In order to make the temperature distribution of the working medium more uniform, the electric heater includes a first heating zone 29a and a second heating zone 210a, and the first heating zone 29a is closer to the first flow collecting zone 21a than the second heating zone 210a. The first heat conducting portion 261a is located in the second heating zone 29a, part of the second heat conducting portion 262a is located in the first heating zone 29a, and part of the second heat conducting portion 262a is located in the second heating zone 210a.

The heating channel has channel spacing. The channel spacing refers to an equivalent distance between the first heat conducting portion and/or the second heat conducting portion which are adjacent to each other. The equivalent distance refers to an average distance between projections of the first heat conducting portion and/or the second heat conducting portion, which are adjacent to each other, projected onto the heat transfer wall. The first heating zone 29a has the first channel spacing s1', and the second heating zone 210a has the second channel spacing s2'. In a case that each adjacent heat conducting portions in the first heating zone 29a have equal channel spacing, the first channel spacing s1' is equal to the equivalent distance between any adjacent heat conducting portions in the first heating zone 29a. In a case that each adjacent heating channels in the first heating zone 29a have different channel spacing, the first channel spacing s1' refers to a minimum value of the equivalent distance between the adjacent heat conducting portions in the first heating zone. Similarly, in a case that each adjacent heat conducting portions in the second heating zone 210a have equal channel spacing, the second channel spacing s2' is equal to the equivalent distance between any adjacent heat conducting portions in the second heating zone 210a; and in a case that each adjacent heating channels in the second heating zone 210a have different channel spacing, the second channel spacing s2' refers to a minimum value of the equivalent distance between the adjacent heat conducting portions in the second heating zone. The first channel spacing s1' is greater than the second channel spacing s2', and the first heating zone 29a is closer to the first flow collecting zone than the second heating zone 210. The heat conducting portion 26a includes two symmetrical forming surfaces which are part of the wall portion of the heating channel, and the forming surfaces are planes/curved surfaces. The forming surfaces have angles with the first flow collecting zone, and at least one of the forming surfaces has an angle of 0 to 90 degrees with the first follow collecting zone; and the forming surfaces have angles with the second flow collecting zone, and at least one of the forming surfaces has an angle of 0 to 90 degrees with the second follow collecting zone. The first heat conducting portion 261a is spaced apart from the second heat conducting portion 262a. The first heat conducting portion 261a has two symmetrical first forming surfaces (not shown in the figure), the second heat conducting portion 262a has two symmetrical second forming surfaces (not shown in the figure), the first and second forming surfaces are planes, and the first and second forming surfaces are perpendicular to the first flow collecting zone. The perpendicular arrangement herein has an error range of 0 to 10 degrees. The first forming surfaces are parallel to the second forming surfaces, and the parallel arrangement herein has an error range of 0 to 10 degrees. The first channel spacing s1' is greater than twice the second channel spacing s2' (the thickness of the heat conduction part itself is not ignored).

Figure 26:
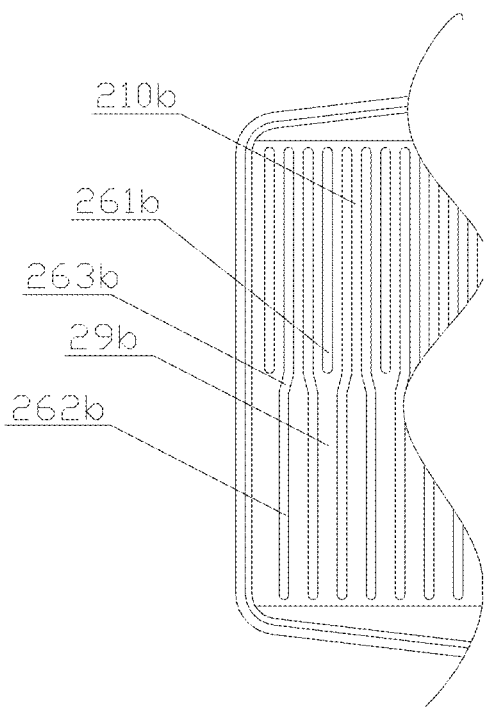
FIG. 26 is a schematic partial view of the heat conducting portion and associated portions shown in FIG. 25.

Referring to FIGS. 25 and 26, the heat conducting portion 26b includes the first heat conducting portions 261b and the second heat conducting portions 262b. Adjacent second heat conducting portions 262b are symmetrical. The first heat conducting portions 261b are located in the second heating zone 29b. The second heat conducting portions 262b are partially located in the first heating zone 29b and partially located in the second heating zone 210b. The second heat conducting portion 262b includes a transition portion 263b, and the transition portion 263b can make the adjacent second heat conducting portions have different channel spacing at the first heating zone and the second heating zone. The first heat conducting portion 261b includes two symmetrical first forming surfaces, the second heat conducting portion located in the second heating zone includes two symmetrical second forming surfaces, the second heat conducting portion located in the second heating zone includes two symmetrical third forming surfaces, and the first, second and third forming surfaces may be planar or curved surfaces. In the present embodiment, the first, second and third forming surfaces are planes, where the plane includes a non-plane formed due to the limitation of the manufacturing process, the adjacent first, second and third forming surfaces are parallel to each other, the parallel arrangement herein has an error range of 0 to 10 degrees, the first, second and third forming surfaces are perpendicular to the first flow collecting zone, the perpendicular arrangement herein has an error range of 0 to 10 degrees, and the first channel spacing is greater than or equal to the second channel spacing and is less than twice the second channel spacing.

The electric heater 100 includes the drive module 4 which is electrically connected with the heating element 6 and the control module 5. The drive module 4 and the control module 5 are located on a same side of the cover body 24. The drive module 4 and the heating element 6 are located on two sides of the cover body 24. The drive module 4 is an insulated gate bipolar transistor or a metal-oxide semiconductor field effect transistor. The drive module 4 can control the power-on or power-off state of the heating element 6, the drive module 4 is fixed to the cover body 24, and the drive module 4 and the fluid cavity 2 are located on two sides of the cover body 24. When the drive module 4 is in operation, a large amount of heat will be generated, and the heat accumulated to a certain extent will adversely affect the drive module 4. In order to evacuate part of the heat generated during work by the drive module 4 in time and reduce the heat accumulation, the electric heater 100 is provided with the heat dissipation portion 244. The drive module 4 transfers part of the heat generated during work to the heat dissipation portion. The heat transfer is generally performed by heat conduction. The heat dissipation portion 244 is in direct contact with the working medium, and the heat dissipation portion 244 is generally arranged at the inlet end of the working medium. The temperature of the inlet of the working medium is relatively low, which can take away the heat of the heat dissipation portion 244 and heat the working medium itself to a certain extent. Specifically, referring to FIG. 15, the first side surface 242 of the cover-body wall is provided with one or more heat dissipation portions 244, and the heat dissipation portions 244 are close to the inlet.

Figure 16:
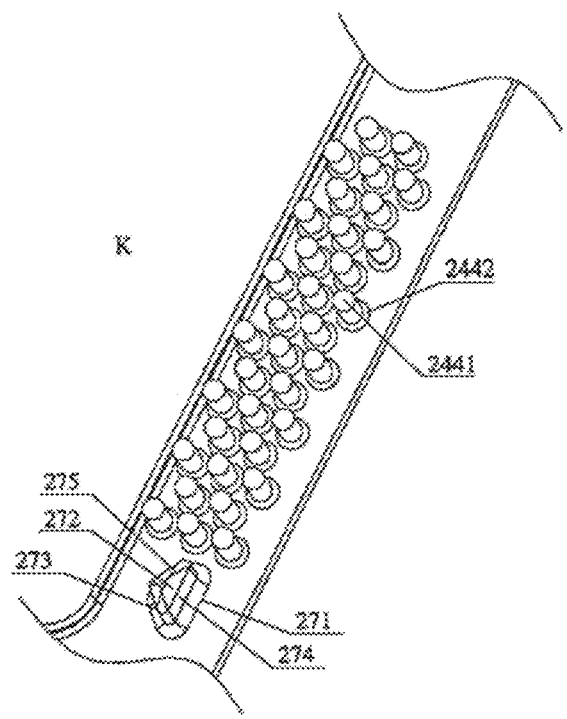
FIG. 16 is a schematic enlarged view of a portion K shown in FIG. 15.

The electric heater 100 includes at least one heat dissipation portion 244 which is capable of dissipating heat for the drive module 4. The heat dissipation portion 244 is made of metal or alloy having good heat conductivity. The heat dissipation portion 244 is arranged corresponding to the position of the strip-shaped protrusion, and the drive module 4 is arranged corresponding to the position of the strip-shaped protrusion. Referring to FIGS. 15 and 16, the heat dissipation portion 244 includes the fixing portion 2441 and the free end, and the heat dissipation portion 244 is fixed to the cover body 24. Specifically, the heat dissipation portion 244 is integrally formed with the cover body 24. The cover body 24 includes the strip-shaped protrusion 245 located on the cover-body wall 242 and protrudes in a direction away from the fluid cavity, and the heat dissipation portion 244 is arranged corresponding to the position of the strip-shaped protrusion 245. The drive module 4 can be fixed to the second side surface 241 of the cover-body wall through the third fixing portion 246. In order to make the drive module 4 be closely fitted with the second side surface 241 of the cover-body wall, a heat-conduction and electricity-insulation element is arranged between the drive module 4 and the second side surface 241 of the cover-body wall, and the heat-conduction and electricity-insulation element such as a heat-conduction and electricity-insulation pad, heat conduction adhesive, heat conduction oil can play the role of insulation and heat conduction. The heat dissipation portion 2444 is located on the first side surface 242 of the fluid cavity cover-body wall and protrudes toward the fluid cavity, the free end 2442 of the heat dissipation portion is located in the first flow collecting zone 21 of the fluid cavity, and the first flow collecting zone 21 is in communication with the inlet of the heater. On the one hand, the heat dissipation portion 244 can dissipate the heat for the drive module 4, and on the other hand, the heat dissipation portion 244 increases the flow resistance of the working medium to a certain extent. In order to minimize the flow resistance, the free end 2442 of the heat dissipation portion is not in full contact with the first side surface 1221 of the heat transfer wall, that is, the free end 2442 of the heat dissipation portion is not in full contact with the housing. The fluid cavity 2 further includes the heat conducting portion 26, and the free end 2442 of the heat dissipation portion is not in contact with the heat conducting portion 26. The heat dissipation portion 244 has a certain height which is a vertical distance from the fixing portion 2441 of the heat dissipation portion to the free end 2442 of the heat dissipation portion. The fluid cavity has a height, which refers to a maximum vertical distance between the second side surface 1222 of the heat transfer wall and the first side surface 242 of the cover-body wall of the fluid cavity. Referring to FIGS. 15 and 16, in the embodiment shown in FIGS. 15 and 16, the heat dissipation portion 244 is cylindrical, which can relatively reduce the flow resistance generated by itself to the working medium to a certain extent. In other embodiments, the heat dissipation portion 244 may be oval or the like. In a case that the heat dissipation portion 244 is cylindrical, an outer diameter of the heat dissipation portion 244 may be 2 to 4 mm. For better heat dissipation and reducing the flow resistance, the heat dissipation portions 244 have a certain arrangement. The cover body 24 has a reference line which is parallel to part of the first wall. In the embodiment shown in FIGS. 15 and 16, the reference line is parallel to the second sub-wall 1212. The heat dissipation portions 244 are arranged on a position of the first side surface 242 of the cover-body wall corresponding to the strip-shaped protrusion 244. The heat dissipation portions 244 are cylindrical, and multiple heat dissipation portions 244 are arranged at an angle of approximately 30 degrees with the reference line. The angle may have other values. Preferably, the range of the angle between the multiple heat dissipation portions 244 and the reference line is 20 to 70 degrees. Specifically, the angle may be 25 degrees, 30 degrees, 35 degrees, 40 degrees, 45 degrees, 50 degrees, 55 degrees, 60 degrees or other integer degrees. The electric heater 100 includes at least three heat dissipation columns. Two adjacent heat dissipation columns have a center distance, the center distance of the adjacent two heat dissipation columns refers to a distance between centers of bottom surfaces of the fixing portions of the two adjacent heat dissipation columns, and the center distance of the two adjacent heat dissipation columns has a range of 4 to 7 mm. Specifically, the number of the heat dissipation columns has a range of 35 to 120. The electric heater 100 includes the first area and the second area, the first area refers to a contact area between the drive module and the cover body or the projection area of the drive module to the cover body, and the second area refers to an area of the heat dissipation portion not in contact with the cover body. A ratio of the second area to the first area is 3 to 4.5, which facilitates the heat dissipation function of the heat dissipation portion 244.

Referring to FIGS. 15 and 16, the electric heater 100 includes the flow guiding portion 27 which can guide the working medium and promote the uniform distribution of the working medium in the fluid cavity to a certain extent. The flow guiding portion 27 is located in the first flow collecting zone, the flow guiding portion 27 includes the fixing portion 271 and the free end 272, and the fixing portion 271 is fixed to the first side surface 242 of the cover-body wall. Specifically, the flow guiding portion 27 is integrally formed with the cover body 24, and the free end 272 of the flow guiding portion is not in full contact with the heat transfer wall 122, thus relatively reducing the flow resistance of the flow guiding portion 27 to the working medium. In other embodiments, the flow guiding portion is fixed to the heat transfer wall, and the free end of the flow guiding portion is not in full contact with the cover body. Specifically, the flow guiding portion is integrally formed with the heat transfer wall. The flow guiding portion 27 at least includes the first flow guiding surface 273, the first flow guiding surface 273 of the flow guiding portion has an angle with the inlet, and the angle has an range of 30 degrees to 60 degrees. Specifically, the angle between the first flow guiding surface 273 and the inlet may be 30 degrees, 35 degrees, 40 degrees, 45 degrees, 50 degrees, 55 degrees, or 60 degrees. In the embodiment shown in FIGS. 15 and 16, the angle between the first flow guiding surface 272 and the inlet is 45 degrees. Specifically, the working medium enters the fluid cavity through the inlet and reaches the first flow collecting zone. In a case that the flow guiding portion 27 is not provided, due to the dynamics of the working medium, a portion of the fluid cavity close to the inlet may has no working medium or little working medium. In order to avoid such a case, the flow guiding portion 27 is provided. After the working medium enters the fluid cavity from the inlet, part of the working medium flows to the first flow guiding surface of the flow guiding portion, then is diverted by the guiding of the first flow guiding surface, and then flows to the fluid cavity close to the inlet. More specifically, the flow guiding portion 27 further includes the second flow guiding surface 274 and the third flow guiding surface 275, where the second flow guiding surface 274 has an angle with the third flow guiding surface 275, and the angle has a range of greater than 0 degree and less than or equal to 45 degrees. A local vortex may arise after the working medium flows through the first flow guiding surface 273 of the flow guiding portion. The second flow guiding surface 274 of the flow guiding portion and the third flow guiding surface 275 of the flow guiding portion have the function of reducing the vortex of the working medium. The first flow guiding surface, the second flow guiding surface and the third flow guiding surface may be planar, convex or concave. The electric heater 100 includes an installation space at least located between the second side wall 1211 and the first wall 121. The installation space includes a space formed by the first side wall 1210, the second side wall 1211, the first housing 11 and the second housing 13. In the embodiment shown in FIG. 2, the contact portion 62 of the heating pipe is located in the installation space, and more specifically, in a direction perpendicular to the first side wall, the contact portion 62 of the heating pipe is located between the first side wall 1210 and the second side wall 1211.

Referring to FIG. 2, the cover body 24 is made of materials such as metal, and is capable of heat conduction and electric conduction. The cover body 24 is in direct contact with the working medium. In order to avoid safety accidents such as electric leakage caused by direct contact of the control module 5 and the cover body 24, the partition portion 3 is arranged between the cover body 24 and the control module 5. The partition portion 3 is at least partially located between the cover body 24 and the control module 5, and the partition portion 3 can function as insulation protection. The partition portion 3 is generally made of a high temperature resistant and insulated polymer material or an inorganic non-metallic material such as ceramic. Specifically, the partition portion 3 is made of materials such as nylon, plastic or the like. Referring to FIGS. 2 to 10, the electric heater 100 includes the conductive element 31 which is electrically connected with the heating element 6 and the drive module 5, such that the power-on and power-off states of the heating element 6 can be controlled by the drive module 5. Specifically, the conductive element may be made of copper, aluminum or the like. The conductive element 31 includes a first conductive contact portion 311, a second conductive contact portion 312 and a connection portion (not shown in the figure). Part of the conductive element 31 is embedded in the base of the partition portion, the first conductive contact portion 311 is exposed on the surface of the base of the partition portion, the second conductive contact portion 312 is exposed on the surface of the base of the partition portion, and the first conductive contact portion 311 is fixed to the heating element 6, such that the first conductive contact portion 311 is electrically connected with the heating element 6. The second conductive contact portion 312 is fixed to the control module 5, such that the second conductive contact portion 312 is electrically connected with the electric control board 500. More specifically, the first conductive contact portion 311 protrudes from the surface of the base of the partition portion, and the second conductive contact portion 312 protrudes from the surface of the base of the partition portion. Or in other words, the electric heater 100 includes the cover body 24, the electric heater includes the electric control board 500, the control module 5 is connected with at least one side of the electric control board 500, the electric heater includes the partition portion, the partition portion 3 includes the insulated base, the base of the partition portion is located between the electric control board 500 and the cover body 24, and the base of the partition portion is capable of isolating the electric control board 500 from the cover body 24. The partition portion 3 further includes the conductive element 31, a part of the conductive element is embedded in the base of the partition portion, the conductive element includes the first conductive contact portion 311 and the second conductive contact portion 312, the first conductive contact portion 311 is exposed on the surface of the base of the partition portion, the second conductive contact portion 312 is exposed on the surface of the base of the partition portion, the first conductive contact portion 311 is fixed to the heating element 6, the fixing arrangement may be welding, the first conductive contact portion 311 is electrically connected with the heating element 6, the second conductive contact portion 312 is fixed to the electric control board 500, and the second conductive contact portion 312 is electrically connected with the electric control plate 50).

The base of the partition portion includes the first side portion 321 of the partition portion and the second side portion 322 of the partition portion. The first side portion 321 of the partition portion faces toward the control module 5. Specifically, the first side portion 321 of the partition portion faces toward the electric control board 500. The second side portion 322 of the partition portion faces away from the electric control board 500. Specifically, the second side portion 322 of the partition portion faces away from the electric control board and faces toward the fluid cavity. The base of the partition portion further includes the plate portion 32 and the bent portion 33. The conductive element 31 is at least partially located between the first side portion 321 of the partition portion and the second side portion 322 of the partition portion. Specifically, the second conductive contact portion 312 is located at the first side portion 321 of the partition portion and protrudes toward the control module 5. The first conductive contact portion 311 is located at the bent portion 33 and faces toward the heating element 6. Specifically, the first conductive contact portion 311 is fixed to the heating pipe contact portion 62, and more specifically, the first conductive contact portion 311 is welded with the heating pipe contact portion. The second conductive contact portion 312 is located at the plate portion, and the second conductive contact portion 312 is electrically connected with the control module 5. Specifically, the first conductive contact portion 311 is welded with the control module 5. The partition portion 3 includes at least one contact groove 324, the contact groove 324 is located at the first side portion 311 of the partition portion, and the conductive element 31 is partially located in the contact groove 324. The partition portion 3 includes at least one insertion hole 325 which is located at the second side portion 322 of the partition portion. The conductive element 31 is partially located in the insertion hole 325. Specifically, the contact groove 324 is arranged corresponding to the position of the insertion hole 325, and the number of contact groove 324 is the same as the number of the insertion hole 325. The contact groove 324 and the insertion hole 325 are capable of fixing the temperature fuse 249 with the conductive element 31. Specifically, the temperature fuse 249 includes the fixing portion which extends into the insertion hole 325 and is in contact with the conductive element located in the insertion hole 325. In order to better fix the temperature fuse 249 with the conductive element 31, the temperature fuse 249 is welded with the conductive element 31. The contact groove 324 can provide a corresponding space for welding the temperature fuse 249 with the conductive element 31, such that the conductive element 31 is in connected with the temperature fuse. In other embodiments, the heating tube contact portion is bent toward the partition portion and fixed to the first conductive contact portion. In such a case, the partition portion may not include the bent portion. In other embodiments, the heating tube contact portion has a bent portion bent toward the partition portion. In such a case, the partition portion includes a plate portion, that is, the partition portion does not include the bent portion.

Figure 17:
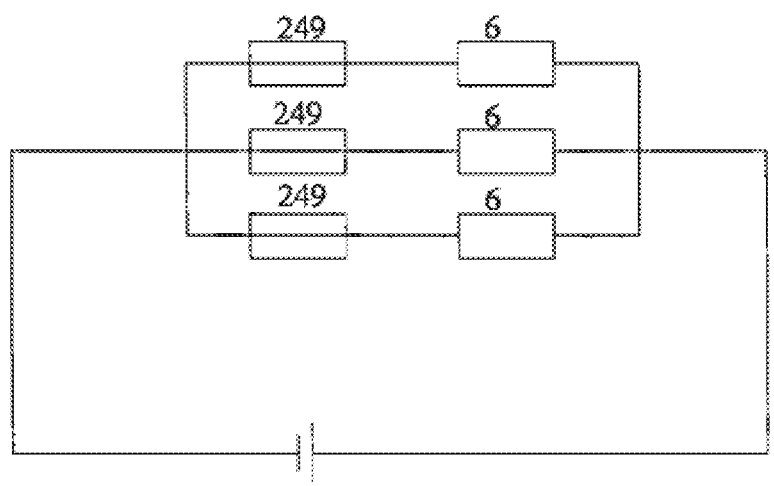
FIG. 17 is a schematic view showing an electrical connection mode between a temperature fuse and a heating element.
Figure 18:
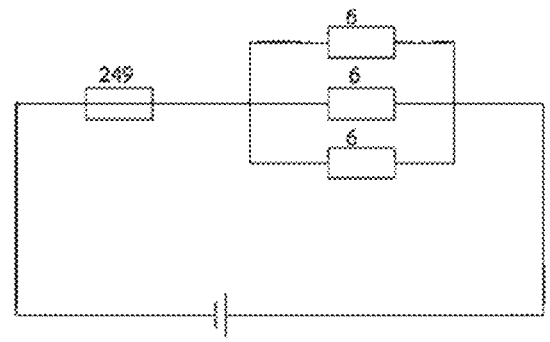
FIG. 18 is a schematic view showing anther electrical connection mode between the temperature fuse and the heating element.
Figure 19:
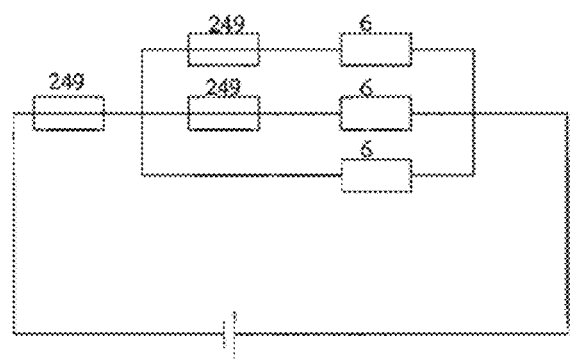
FIG. 19 is a schematic view showing yet another electrical connection mode between the temperature fuse and the heating element.

The electric heater 100 includes at least one temperature fuse 249 which can avoid the dry burning of the electric heater and improve the safety and reliability of the electric heater. The conductive element 31 is electrically connected with the temperature fuse 249, such that the temperature fuse 249 is electrically connected with the heating element 6, and furthermore an energization state of the temperature fuse 249 can affect an energization state of the heating element 6. Specifically, the temperature fuse 249 is connected in series and/or in parallel with the heating element 6. Referring to FIG. 17, FIG. 17 is a schematic view showing the electrical connection between the temperature fuse 249 and the heating element 6. In FIG. 17, each heating element 6 is connected in series with one temperature fuse 249, and the heating elements 6 are connected in series with the temperature fuses 249. In other embodiments, referring to FIG. 18, FIG. 18 is another schematic view showing the electrical connection between the temperature fuse 249 and the heating element 6. In FIG. 18, the temperature fuse 249 is connected in parallel with the heating element 6. In other embodiments, referring to FIG. 19, FIG. 19 is another schematic view showing the electrical connection between the temperature fuse 249 and the heating element 6. In FIG. 19, parts of the temperature fuses 249 are connected in series with the heating elements 6, and parts of the temperature fuses 249 are connected in parallel with the heating elements 6, that is, the temperature fuses 249 are connected in series and in parallel with the heating elements 6. It should be noted that in a case that the temperature fuses 249 are connected in parallel with the heating elements 6, the electric heater 100 includes at least two heating elements 6.

Referring to FIG. 2, the first conductive contact portion 311 is electrically connected with the heating tube contact portion 62, where the first conductive contact portion 311 and the heating tube contact portion 62 are both electricity-conductive. In order to improve the insulation strength, the partition portion 3 includes the protruding portion 331, the protruding portion 311 is located at the bent portion 33 and faces toward the heating element 6, and the first contact portion 311 is closer to the fluid cavity 2 than the protruding portion 331. Specifically, the first conductive contact portion 311 is located between the first wall 25 and the protruding portion 311, that is, the first conductive contact portion 311 is located between the fluid cavity 2 and the protruding portion 331, thus reducing the risk of electricity leakage between the heating tube contact portion 62 and its surroundings. More specifically, the first contact portion 311 includes a first top end (not shown in the figure), the first top end faces toward the housing 1, and the protruding portion 311 includes a second top end 3311, the second top end faces toward the housing 1 in a direction perpendicular to the plate portion 32, the second top end 3311 is further away from the plate portion than the first top end, and the second top end 3311 is closer to the housing than the first top end. Specifically, the first top end faces toward the second housing 13, and the second top end 3311 faces toward the second housing 13, and the second top end 3311 is closer to the second housing 13 than the first top end. The partition portion 3 further includes the fixing portion 323 of the partition portion, that is, the fifth fixing portion, and the fixing portion 323 of the partition portion enables the drive module 4 to be fixed to the cover body 24. Specifically, the drive module 4 is an insulated gate bipolar transistor (Insulated Gate Bipolar Transistor, IGBT) module, and the IGBT module can be fixed to the cover body 24 through the fixing portion 323 of the partition portion.

The electric heater 100 includes the drive module 4. The drive module 4 is electrically connected with the control module 5 and the heating element 6, and the drive module 4 is capable of controlling the power-on or power-off state of the heating element 6. The drive module 4 is located at the first side portion 321 of the partition portion and is fixed to the cover body 24 and the partition portion 3. In the embodiment shown in FIG. 2, the drive module 4 is an IGBT module, and the drive module 4 is connected with the control module 5, for example, the drive module 4 is connected with the control module 5 by welding. The drive module 4 is fixed to the strip-shaped protrusion 245 of the cover body through the fixing portion 323 of the partition portion. In order to make the drive module 4 in close contact with the cover body 24 and to insulate the drive module 4 from the cover body 24, a heat-conduction and electricity-insulation portion such as a heat-conduction and electricity-insulation pad, heat conduction adhesive, or heat conduction oil is arranged between the drive module 4 and the strip-shaped protrusion 245 of the cover body. The drive module 4 generates heat during operation, the heat is not conducive to the drive module 4. The heat dissipation portion 244 of the first side surface of the cover-body wall is conducive to the heat dissipation of the drive module 4. When the electric heater 100 is in operation, part of the heat generated by the drive module 4 is transferred to the heat dissipation portion 244, the heat dissipation portion 244 is in direct contact with the working medium, and the temperature of the flowing working medium is low, which can take away part of the heat of the heat dissipation portion 244, thereby achieving the object of lowering the temperature of the drive module 4.

It should be noted that, in other embodiments, the drive module 4 may be a metal-oxide semiconductor field effect transistor (Metal-Oxide-Semiconductor Field-Effect Transistor, MOSFET) module.

The electric heater 100 includes the control module 5. In the illustrated embodiment, the control module is an electric control board, the control module 5 is located between the cover body 24 and the first housing 11, the control module 5 and the heating element 6 are located on two sides of the fluid cavity 2, the cover body 24 and the partition portion 3, and the control module 5 and the partition portion 3 are located on a same side of the cover body 24 and the fluid cavity 2. The control module 5 includes a first-electric-control-board body portion (not shown in the figure), a second-electric-control-board body portion 51 and a sixth fixing portion 52, where the first-electric-control-board body portion faces toward the partition portion 3, the second-electric-control-board body portion 51 faces away from the partition portion 3, and the sixth fixing portion 52 is fixed to the partition portion 3 and the cover body 24. The electric heater 100 includes the first safety distance which refers to the distance between the partition portion 3 and the control module 5. On the one hand, the first safety distance can improve the insulation performance of the partition portion 3, and on the other hand, can improve the safety performance of the electric heater 100. The first safety distance refers to the distance between the first-electric-control-board body portion and the first side portion 321 of the partition portion, and the first safety distance is greater than 0. In general, the first safety distance should be greater than or equal to 2 mm. Specifically, the first safety distance may be 3 mm, 2.5 mm, or 2 mm and so on. The electric heater 100 further includes a second safety distance, which refers to a minimum distance between the control module 5 and the first housing 11. In order to improve the safety performance of the electric heater 100, the second safety distance is greater than 0. Specifically, the second safety distance is greater than 6 mm. More specifically, the second safety distance has a range of 6 to 8 mm. Specifically, the first housing body 111 includes an inner side and an outer side, where the inner side of the first housing body faces toward the fluid cavity, and the outer side of the first housing body faces away from the fluid cavity. The second safety distance refers to a distance between the second body portion 51 of the control module and the inner side of the first housing body. More specifically, the second safety distance refers to the minimum distance between the second body portion 51 of the control module and the inner side of the first housing body.

The electric heater 100 includes the wiring portion 7 which is connected with an effective power supply to provide electric power for the electric heater 100. The wiring portion 7 includes the strong electricity portion 71 and the weak electricity portion 72, the strong electricity portion 71 is fixed to the second side wall 1211, the weak electricity portion 72 is fixed to the second side wall 1211, part of the strong electricity portion 71 is located in the installation zone, part of the weak electricity portion 72 is located in the installation zone, a conductive portion of the strong electricity portion 71 is fixedly connected with the contact portion 62 of the heating element, the strong electricity portion 71 is electrically connected with the heating element 6, a conductive portion of the weak electricity portion 72 is fixed to the electric control board 500, the weak electricity portion 72 is electrically connected with the control module 5, and the strong electricity portion 71 and the weak electricity portion 72 are electrically connected with the control module 5. The strong electricity portion 71 includes a strong electrical connecting portion (not shown in the figure) and a strong electrical insertion portion (not shown in the figure). The strong electric connecting portion is used for the electrical connection between the strong electricity portion 71 and the electric control board 500, and the strong electric insertion portion is used for fixing the strong electricity portion 71 to the second side wall. The weak electricity portion 72 includes a weak electric connecting portion (not shown in the figure) and a weak electric insertion portion (not shown in the figure). The weak electric connecting portion is used for the electrical connection between the weak electricity portion 72 and the electric control board 500, and the weak electric insertion portion is used for fixing the weak electricity portion 71 to the second side wall. Referring to FIG. 2, in the embodiment shown in FIG. 2, the strong electricity portion 71, the weak electricity portion 72 and the second side wall 1211 are sealed and fixed. Specifically, the strong electricity portion 71, the weak electricity portion 72 and the second side wall 1211 are sealed with sealing rings and fixed by screws. The strong electricity portion 71 and the weak electricity portion 72 are located on a same side of the electric heater 100. The strong electricity portion 71 and the weak electricity portion 72 are at least partially located in the installation space. The strong electricity portion 71 can be directly connected to the control module 5. The electric heater 100 includes the adapter plate 721, and the adapter plate 721 includes the body portion 7211 of the adapter plate, the adapter hole (not shown in the figure) and the leading end 7212. The leading end 7212 protrudes from the body portion 7211 of the adapter plate. Specifically, the leading end 7212 protrudes from the body portion 7211 and faces toward the electric control board. The adapter plate 721 enables the weak electricity portion 72 to be electrically connected with the control module 5. Specifically, the adapter plate 721 is electrically connected with the weak electricity portion 72, and the connection method may be plugging. In such a case, the adapter plate 721 has the adapter hole, the weak electricity portion 72 has the leading end, and the leading end of the weak electricity portion is plugged into the adapter hole of the adapter plate 721. The adapter plate 721 has an adapter pins. The adapter pin can be welded to the control module, such that the weak electricity portion is connected with the control module. Alternatively, the adapter plate 721 is connected with the weak electricity portion 72 by welding or the like, the adapter plate 721 has the adapter pin, and the adapter pin is electrically connected with the control module 5 by welding or the like. The adapter plate 721 has a fixing portion which can be assembled and fixed together with the housing body 12 by means of screws or the like. In other embodiments, the weak electricity portion 72 is directly connected with the control module 5, and the connection method is welding or the like. The adapter plate 721 has an adapter fixing portion, and the adapter plate 721 is fixed to the housing body 12 through the adapter fixing portion 7211. Specifically, the adapter plate fixing portion is fixed to the housing body by screws.

In the embodiment shown in FIGS. 2 to 21, the strong electricity portion 71 and the weak electricity portion 72 are located on the same side of the electric heater. In other embodiments, the strong electricity portion 71 and the weak electricity portion 72 may be located on different sides of the electric heater. Referring to FIGS. 2 to 21, the strong electricity portion 71 and the weak electricity portion 72 are located on the same side of the electric heater. When the electric heater 100 is installed, the strong electricity portion 71 is installed from the outside of the electric heater 100 to the inside of the electric heater 100, and the space required for installation is small. The weak electricity portion 72 is installed from the inside of the electric heater 100 to the outside of the electric heater 100, and the space required for installation is large. Therefore, the second side wall 1211 is provided with the protrusion portion 12111, the protrusion portion 12111 protrudes away from the fluid cavity 2, and the protrusion portion 12111 is in cooperation with the weak electricity portion 72. The electric heater 100 includes the adapter plate 721, the control module 5 is electrically connected with the weak electricity portion 72 through the adapter plate 721, and the adapter plate 721 includes the adapter hole 7211 and the leading end 7212. The adapter hole 7211 is in plugging-connection with the weak electricity portion 72, and the leading end 7212 is in plugging-connection with the control module 5; or the adapter hole 7211 is in plugging-connection with the control module 5, and the leading end 7212 is in plugging connection with the weak electricity portion 72. The back-to-back protrusion portion 12111 includes a first portion 1211a, a second portion 1211b and a protrusion portion 1211c. In a direction parallel to the first side wall 1210, the second portion 1211b of the protrusion portion is located between the first portion 1211a of the protrusion portion and the third portion 1211I c of the protrusion portion, and the second portion 1211b of the protrusion portion is parallel to the first side wall 1210, where the parallel arrangement has an error range of ±10 degrees. The first portion 1211a of the protrusion portion and the protrusion portion 1211c are perpendicular to the first side wall 1210, where the perpendicular arrangement has an error range of ±10 degrees. The second side wall 1211 further includes an installation portion 1211d of the strong electricity portion, the third portion 1211c of the protrusion portion is closer to the installation portion 1211d of the strong electricity portion than the first portion 1211a of the first side wall, and the installation portion 1211d of the strong electricity portion is perpendicular to the first side wall 1210. The electric heater 100 includes the installation zone which includes a space between the second side wall and the first side wall. In the embodiment shown in FIG. 2, the inlet and outlet are located on the same side of the electric heater, a communication cavity is arranged between the inlet and the inlet of the fluid cavity, and another communication cavity is arranged between the outlet and the outlet of the fluid cavity. The installation zone does not include the communication cavity between the inlet and the inlet of the fluid cavity or the other communication cavity between the outlet and the outlet of the fluid cavity. The installation zone can provide space for the installation of the strong electricity portion and weak electricity portion. The installation zone is part of the installation space.

The electric heater 100 includes the inlet 81 and the outlet 82, and the inlet 81 and the outlet 82 are in communication with the fluid cavity. Referring to FIG. 2, the inlet 81 and the outlet 82 are located on the same side of the electric heater 100 and on the same side as the strong electricity portion 71 and the weak electricity portion 72. In other embodiments, the inlet and the outlet are located on different side of the electric heater.

The electric heater 100 includes the breather hole 9 which has the function of keeping the inside pressure of the electric heater consistent with the outside pressure of the electric heater 100. In a specific embodiment, the breather hole 9 is located on the first housing 11, the breather hole 9 penetrates through the first housing 11, and the breather hole 9 is not in communication with the fluid cavity 2; or, the breather hole 9 is located on the second housing 13, the breather hole 9 penetrates through the second housing 13, and the breather hole 9 is not in communication with the fluid cavity 2; or, the breather hole 9 is located on the housing body 13, the breather hole 9 penetrates through the housing body 12, and the breather hole 9 is not in communication with the fluid cavity 2. The breather hole 9 is applied with the breather-hole film for relative sealing, which allows the air to pass through but not the water or other medium. The breather-hole film is simple and convenient. In other embodiments, the breather holes may be sealed with sealing plugs. The sealing plug may be a rubber plug or the like, used for the sealing plug. The sealing plug also has a function of keeping the pressure inside the electric heater 100 consistent with the pressure outside the electric heater 100. In the embodiment shown in FIGS. 2 and 3, the breather hole 9 is located on the housing body. In other embodiments, the breather hole is located on the first housing, and the breather hole penetrates through the first housing, and the breather hole is not in communication with the fluid cavity; or, the breather hole is located on the second housing, and the breather hole penetrates through the second housing, and the breather hole is not in communication with the fluid cavity. The breather hole has the function of keeping the inside pressure of the electric heater consistent with the outside pressure of the electric heater. The breather hole is at least located on the first housing, the second housing and the housing body, and the breather hole is not in communication with the fluid cavity.

Figure 27:
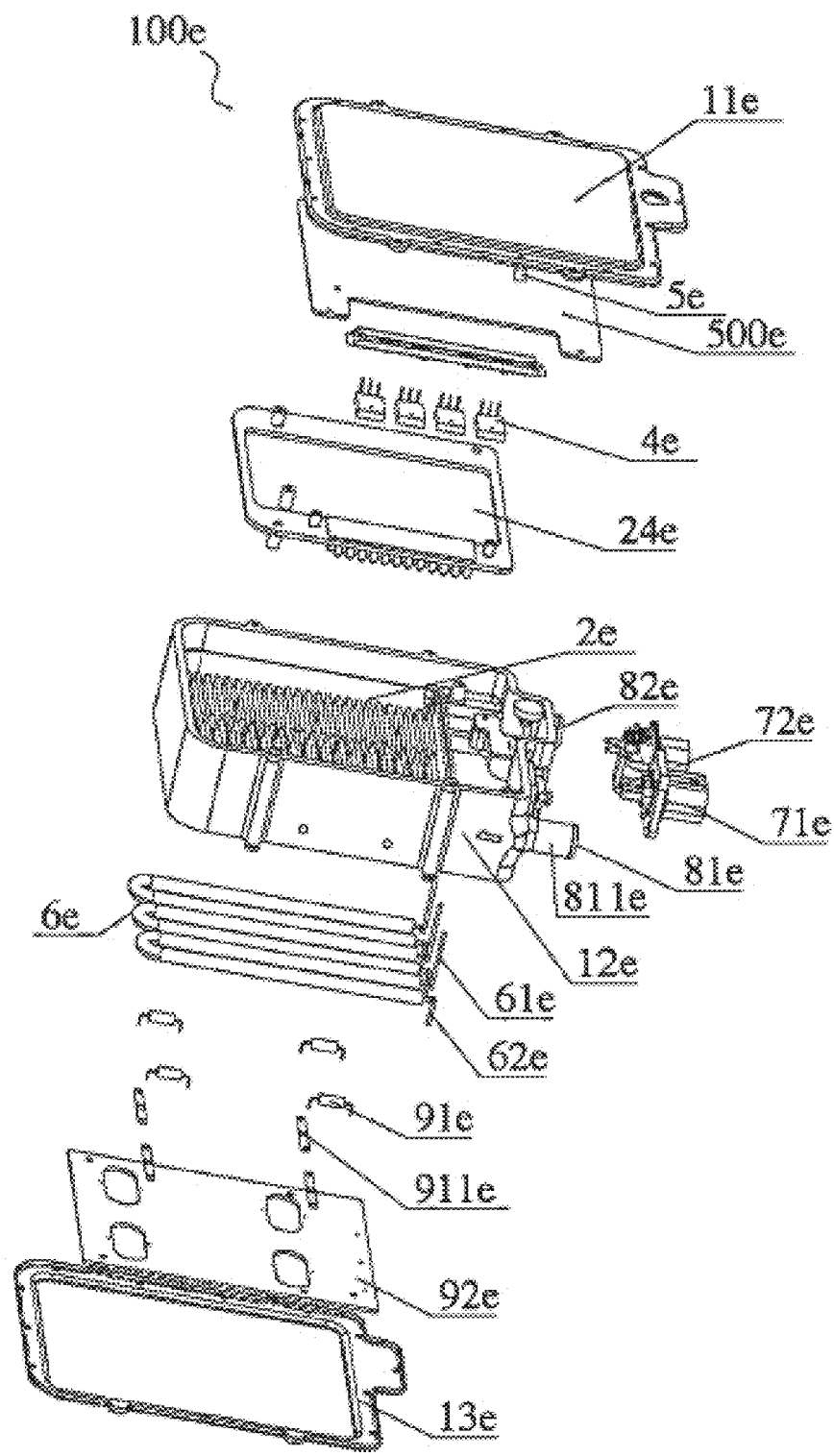
FIG. 27 is a schematic exploded view of a second embodiment of the electric heater.
Figure 28:
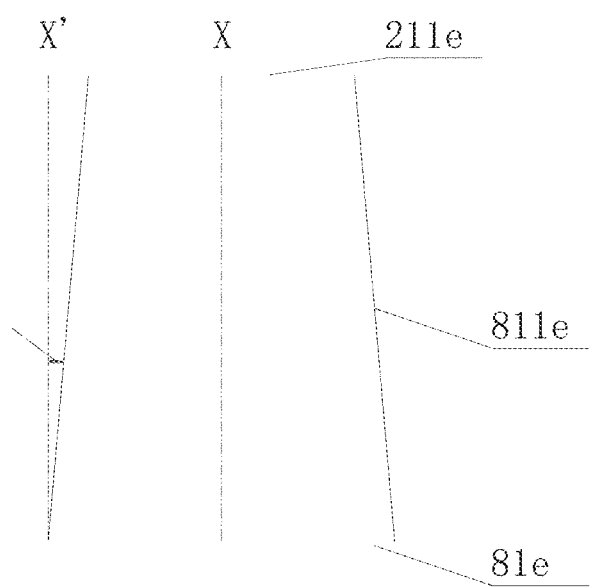
FIG. 28 is a schematic sectional view of an inlet tube shown in FIG. 27.

Referring to FIGS. 27 and 28, FIGS. 27 and 28 show a second embodiment of the electric heater. In the second embodiment shown in FIGS. 27 and 28, the electric heater 100e includes a housing body 12e, a fluid cavity 2e, a drive module 4e, a control module 5e, an electric control board 500e, a heating element 6e, a strong electricity portion 71e, a weak electricity portion 72e, an inlet 81e and an outlet 82e. The housing body 12e, the fluid cavity 2e, the drive module 4e, the control module 5e, the heating element 6e, the strong electricity portion 71e, the weak electricity portion 72e, the inlet 81e and the outlet 82e are the same as or similar to the corresponding portions of the first embodiment. The electric heater includes a partition portion, and the partition portion at least includes a first isolation layer. The electric heater 100 includes a circuit board 92e, the circuit board 92e is located outside the fluid cavity 2e, the electric control board 92e is located outside the fluid cavity 2e, the electric control board 500e is located on a side facing away from the first side surface of the cover-body wall of a cover body 24e, the circuit board 92e is located on a side facing away from the first side surface of the heat transfer wall, and the circuit board 92e and the heating element 6e are located on the same side of a second side surface of the heat transfer wall. The circuit board 92e is electrically connected with the heating element 6e.

Different from the first embodiment, the partition portion in the electric heater 100e is made of a non-air insulating material such as a polymer insulating material. The partition portion includes at least the first isolation layer which is at least partially located between the cover body and the control module. Specifically, the first isolation layer is made of the non-air insulating material such as an insulating polymer material. Specifically, the first isolation layer may be made of insulating glue, an insulating gasket, an insulating paper or the like. The non-air insulating material can be in contact with the material that needs insulation by means of spraying, electroplating, coating, pasting, covering or the like. In other embodiments, in a case that the first isolation layer is made of the non-air insulation material, the risk of electric leakage caused by the fracture or damage of the first isolation layer may occur during the use of the electric heater. In order to avoid such danger, the partition portion includes at least the first isolation layer and the second isolation layer, and the material of the second isolation layer may be the same as or different from that of the first isolation layer. In a case that the partition portion includes at least the first isolation layer and the second isolation layer, the first isolation layer may be or may not be in contact with the second isolation layer. Specifically, the first isolation layer is in contact with the cover body, for example, the first isolation layer is sprayed on the cover body, the second insulation layer is in contact with the electric control board, for example, the second isolation layer is sprayed on the electric control board, the first isolation layer may be or may not be in contact with the second isolation layer. In a case that the first isolation layer is not in contact with the second isolation layer, it is the air between the first isolation layer and the second isolation layer. In such a case, the air also functions as an insulator.

The electric heater 100e includes the cover body 24e which has the same or like structure as the cover body 24 in the first embodiment of the electric heater (in this case, the difference between the cover body 24e and the cover body 24 lies in the fixing portion and the like, this small difference does not affect the overall function of the cover body). The electric heater 100e includes a first safety distance which refers to the distance between the cover body 24e and the electric control board 500e. Specifically, the first safety distance refers to a minimum distance between the first side surface of the cover body 24e and the second body portion of the electric control board (facing toward the cover body 24e). The first safety distance is greater than 0. In the present embodiment, the first safety distance is greater than or equal to 1 mm such as 2 mm, 3 mm, 5 mm or the like. More specifically, in a case that the electric heater does not include the partition portion, the first safety distance is greater than or equal to 5 mm. Accordingly, unlike the first embodiment, the electric heater 100e includes a protection circuit which includes at least one temperature fuse 91e and the circuit board 92e. The temperature fuse 91e has the function of avoiding dry burning of the electric heater and improving the safety and reliability of the electric heater. The circuit board 92 is capable of electrically connecting the temperature fuse 91e, the heating element 6e, the control module 5e and the drive element 4e. Referring to FIG. 27, in the embodiment shown in the figure, the circuit board 92e is in the form of a circuit board, and the circuit board and the control module are located on two sides of the second side portion, thus avoiding the internal wiring problem of the electric heater, making the internal structure of the electric heater 100e more compact and safe, reducing the process in the production process, improving the production efficiency, and facilitating the automation of the production line. The temperature fuse 91e is located between the heat transfer wall and the second housing 13e. Specifically, the temperature fuse 91e is fixed to the second side surface of the heat transfer wall. More specifically, the electric heater 100e includes a fixing portion 911e of the temperature fuse which enables the temperature fuse 91 to be fixed to the second side surface of the heat transfer wall, for example, by means of screws. The circuit board includes a circuit board groove for accommodating and facilitating the electrical connection of the temperature fuse and the circuit board. It should be noted that, in other embodiments, the circuit board 9e is in the form of a wire which is electrically connected with the heating element and the control module and fixed at an appropriate position. The electrical connection between the heating element 6e and the temperature fuse 91e is the same as the electrical connection between the heating element 4 and the temperature fuse 91e in the first embodiment. Unlike the first embodiment, in the second embodiment, the first housing lie does not include the first ridge portion and the first recessed portion. The electric heater 100e further includes a second safety distance which refers to a distance between the second housing 13e and the circuit board 92e. Specifically, the second safety distance refers to a minimum distance between one side of the second housing 13e facing toward the circuit board 92e and one side of the circuit board 92e facing toward the second housing 13e. In order to avoid electric leakage in the electric heater 100e, the second safety distance is greater than 0. In the illustrated embodiment, the heating element 6e is a heating tube, the heating tube 6e includes a first contact portion 61e and a second contact portion 62e, and the first contact portion 61e of the heating tube extends upward and is fixed to the electric control board 500e. Specifically, the first contact portion 61e of the heating tube first is welded to the electric control board, and the second contact portion 62e of the heating tube is fixed downward to the circuit board 92e. Specifically, the second contact portion 62e of the heating tube is welded downward to the circuit board 92e, such that the heating tube is connected with the electric control board 500e and the circuit board 92e.

The electric heater 100e includes an inlet tube 811e and an outlet tube (not shown in the figure). The inlet tube 811e communicates the inlet 81e with the inlet of the fluid cavity, and the outlet tube communicates the outlet with the outlet of the fluid cavity. Specifically, the inlet tube 811e and the outlet tube are integrally formed with the housing body 12e, for example, by casting, 3D printing, machining or the like. In order to facilitate the formation of the inlet tube 811e and the outlet tube, the inlet tube has a necking angle β, the necking angle β has a range of greater than or equal to 0 degrees and less than or equal to 4 degrees. The necking angle refers to an angle between a flow passage from the inlet 81e to an inlet pipe wall of the inlet 211e of the fluid cavity and a center line of the inlet tube. Referring to FIG. 28, FIG. 28 is a sectional view of the inlet tube 811e, where X is the centerline of the inlet tube 811e, and X' is a line parallel to X and intersecting the inlet. Similarly, the outlet tube has a necking angle β.

It should be noted that, the description of the above embodiments is only used to illustrate the present application and is not intended to limit the technical solutions of the present application such as the definitions of "inside", "outside", "vertical", and "perpendicular". Although the present application is described in detail with reference to the above embodiments, it should be understood by those skilled in the art that, various combinations, modifications and equivalents can be made to the technical solutions of the present application without departing from the spirit and scope of the present application, all of which are intended to fall within the scope defined by the claims of the present application.

The invention claimed is:

1. An electric heater, comprising a heating element, a heat transfer wall and a control module, wherein the electric heater comprises a fluid cavity, an inlet and an outlet, the fluid cavity is in communication with the inlet and the outlet, the heat transfer wall is a part of a wall portion forming the fluid cavity, the heating element is fixed or position-limited to at least part of the heat transfer wall, the heating element is located outside the fluid cavity, and at least part of the heating element is in contact with the heat transfer wall; and the electric heater comprises a cover-body wall, the cover-body wall is another part of the wall portion forming the fluid cavity, the control module is located outside the cover-body wall, the control module is located outside the fluid cavity, and the control module is electrically connected with the heating element, the electric heater comprises a first housing and a second housing, the first housing and the second housing are in sealing arrangement with and fixed to the housing body; the electric heater comprises a protruding structure, the protruding structure is located between the first housing and the housing body; the protruding structure comprises a fixing portion and a free end, the fixing portion of the protruding structure is fixed to the first housing, and the free end of the protruding structure is in direct contact with the housing body; and a contact area between the fixing portion of the protruding structure and the first housing is defined as a first contact area, a contact area between the free end of the protruding structure and the housing body is defined as a second contact area, and the first contact area is greater than or equal to the second contact area.

2. The electric heater according to claim 1, wherein the electric heater comprises a housing body and a cover body, one side wall of the cover body is defined as the cover-body wall, the housing body comprises a first side wall and a second side wall, the first side wall is fixedly connected with the second side wall, the first side wall is fixed to the heat transfer wall, and the first side wall is fixed to the cover-body wall, the first side wall intersects with the heat transfer wall, the first side wall intersects with the cover-body wall, the second side wall is located outside the fluid cavity; the electric heater comprises an installation zone, the installation zone comprises a space between the first side wall and the second side wall, the installation zone enables that at least part of the first side wall is not in contact with the second side wall, and the installation zone is not in communication with the fluid cavity;

the heat transfer wall and the housing body are fixedly connected or integrally formed with the cover body, an end portion of the heating element is extended out from the heat transfer wall, the end portion of the heating element is located in the installation zone formed by two side walls of the housing body, a strong electricity portion and a weak electricity portion of the electric heater are arranged in the installation zone, the weak electricity portion is electrically connected with the control module, and the strong electricity portion of the electric heater is electrically connected with the heating element.

3. The electric heater according to claim 1, wherein the heat transfer wall comprises a first side surface of the heat transfer wall, the first side surface of the heat transfer wall faces toward the fluid cavity, and with reference to the first side surface of the heat transfer wall, the heating element and the fluid cavity are not located a same side, the cover-body wall has a first side surface of the cover-body wall, and the first side surface of the cover-body wall faces toward the fluid cavity, the first side surface of the cover-body wall faces the first side surface of the heat transfer wall, and the control module is located on another side of the cover-body wall; and the electric heater comprises a first flow collecting zone, a second flow collecting zone, a heating channel, an inlet of the fluid cavity and an outlet of the fluid cavity, the first flow collecting zone is in communication with the inlet of the fluid cavity and the heating channel, the second flow collecting zone is in communication with the outlet of the fluid cavity and the heating channel, the first flow collecting zone is in communication with the second flow collecting zone; the electric heater comprises a heat conducting portion, the heat conducting portion is located between the first side surface of the heat transfer wall and the first side surface of the cover-body wall; and the electric heater comprises a third flow collecting zone, the first flow collecting zone is in communication with the third flow collecting zone at least through part of the heating channel, the third flow collecting zone is in communication with the second flow collecting zone through part of the heating channel, and the first flow collecting zone is in communication with the second flow collecting zone through the third flow collecting zone.

4. The electric heater according to claim 3, wherein the electric heater comprises a cover body, the control module is an electric control board, the control module is connected with at least one side of the electric control board; the electric heater comprises a partition portion, the partition portion comprise a base, the base of the partition portion is located between the electric control board and the cover body, and the base of the partition portion is capable of isolating the electric control board from the cover body; the partition portion further comprises a conductive element, part of the conductive element is embedded in the base of the partition portion, the conductive element comprises a first conductive contact portion and a second conductive contact portion, the first conductive contact portion is exposed on a surface of the base of the partition portion, the second conductive contact portion is exposed on the surface of the base of the partition portion, the first conductive contact portion is fixed to the heating element, the first conductive contact portion is electrically connected with the heating element, the second conductive contact portion is fixed to the electric control board, and the second conductive contact portion is electrically connected with the electronic control board.

5. The electric heater according to claim 2, wherein the electric heater comprises a drive module, the drive module is electrically connected with the heating element and the control module, the drive module is electrically connected with the control module, the drive module and the control module are located on a same side of the cover body, the drive module and the heating element are located on two sides of the cover body, and the drive module is an insulated gate bipolar transistor or a metal-oxide semiconductor field effect transistor.

6. The electric heater according to claim 2, wherein a plurality of heat dissipation portions are formed by protruding of one side of the cover body, the plurality of heat dissipation portions face toward the heat transfer wall, a drive module is located on the other side of the cover body; and each of the heat dissipation portion comprises a fixing portion and a free end, the fixing portion is connected with the cover body, and the free end is not in full contact with the heat transfer wall.

7. The electric heater according to claim 2, wherein the strong electricity portion is fixed to the second side wall, the weak electricity portion is fixed to the second side wall, part of the strong electricity portion is located in the installation zone, part of the weak electricity portion is located in the installation zone, a conductive portion of the strong electricity portion is fixedly connected with a conductive end portion of the heating element, the strong electricity portion is electrically connected with the heating element, a conductive portion of the weak electricity portion is fixed to the electric control board, and the weak electricity portion is electrically connected with the control module; and the second side wall comprises a protruding portion, the protruding portion protrudes away from the fluid cavity, the protruding portion is in cooperation with the weak electricity portion; and the electric heater comprises an adapter plate, the control module is electrically connected with the weak electricity portion through the adapter plate, the adapter plate comprises an adapter hole and a leading end, the adapter hole is in plugging-connection with the weak electricity portion, and the leading end is in plugging-connection with the control module, or, the adapter hole is in plugging-connection with the control module, and the leading end is in plugging-connection with the weak electricity portion.

8. The electric heater according to claim 1, wherein the electric heater comprises a breather hole; the breather hole is located on the first housing, the breather hole penetrates through the first housing, and the breather hole is not in communication with the fluid cavity.

9. The electric heater according to claim 4, wherein the electric heater comprises a temperature fuse, the temperature fuse is electrically connected with the heating tube and the electric control board; the electric heater comprises a temperature fuse fixing portion, the heat transfer wall comprises a second side surface of the heat transfer wall, the second side surface of the heat transfer wall faces away from the fluid cavity, and the temperature fuse fixing portion is fixed to the second side surface of the heat transfer wall;

the temperature fuse comprises the temperature fuse fixing portion, the temperature fuse fixing portion is fixed to the conductive element, the temperature fuse is electrically connected with the conductive element, and the temperature fuse is electrically connected with the heating element through the conductive element; and the electric heater comprises a first safety distance, the first safety distance refers to a distance between a first sub-portion of the partition portion and the electric control board, and the first safety distance is greater than 2 mm; the electric heater comprises a second safety distance, the second safety distance refers to a distance between the electric control board and the first housing, and the second safety distance is greater than 6 mm.

10. The electric heater according to claim 4, wherein the heating element is a heating tube, the heating tube is integrally formed with the housing body by casting, the housing body is made of aluminum, the cover body is made of aluminum, the heat transfer wall comprises a second side surface of the heat transfer wall, the second side surface of the heat transfer wall faces away from the fluid cavity, the first side surface of the heat transfer wall faces away from the second side surface of the heat transfer wall, at least part of the heating pipe is fixed or position-limited between the first side surface of the heat transfer wall and the second side surface of the heat transfer wall, the heating pipe comprises a heating pipe contact portion, at least part of the heating pipe contact portion is located in the installation zone, at least part of the heating pipe contact portion is located in installation zone, at least part of the heating pipe contact portion is located between the second side wall and the first side wall, and the heating pipe contact portion is fixed to the first conductive contact portion by welding.

11. The electric heater according to claim 4, wherein the control module is an electric control board, the electric heater comprises the partition portion, the partition portion at least comprises a first isolation layer, the electric heater comprises the circuit board, the circuit board is located on one side of the first side surface of the heat transfer wall facing away from the fluid cavity, the electric control board is located on one side that the first side surface of the heat transfer wall facing toward the fluid cavity, the circuit board and the electric control board are located on two sides of the cover body, the circuit board and the heating element are located on the same side of the first side surface of the heat transfer wall, the circuit board is electrically connected with the heating element and the electronic control plate, the heating element is a heating tube, a heating tube contact portion comprises a heating pipe first contact portion and a heating tube second contact portion, the heating tube first contact portion is fixed to the electric control board by welding, and the heating tube second contact portion is welded to the circuit board.

12. The electric heater according to claim 1, wherein the electric heater comprises a first heating zone and a second heating zone, the first heating zone comprises a first channel spacing, the second heating zone comprises a second channel spacing, the first channel spacing is greater than the second channel spacing, the first heating zone is located between the first flow collecting zone and the second heating zone, and the second heating zone is located between the first heating zone and the second flow collecting zone.

13. The electric heater according to claim 2, wherein the heat transfer wall comprises a first side surface of the heat transfer wall, the first side surface of the heat transfer wall faces toward the fluid cavity, and with reference to the first side surface of the heat transfer wall, the heating element and the fluid cavity are not located a same side, the cover-body wall has a first side surface of the cover-body wall, and the first side surface of the cover-body wall faces toward the fluid cavity, the first side surface of the cover-body wall faces the first side surface of the heat transfer wall, and the control module is located on another side of the cover-body wall; and the electric heater comprises a first flow collecting zone, a second flow collecting zone, a heating channel, an inlet of the fluid cavity and an outlet of the fluid cavity, the first flow collecting zone is in communication with the inlet of the fluid cavity and the heating channel, the second flow collecting zone is in communication with the outlet of the fluid cavity and the heating channel, the first flow collecting zone is in communication with the second flow collecting zone; the electric heater comprises a heat conducting portion, the heat conducting portion is located between the first side surface of the heat transfer wall and the first side surface of the cover-body wall; and the electric heater comprises a third flow collecting zone, the first flow collecting zone is in communication with the third flow collecting zone at least through part of the heating channel, the third flow collecting zone is in communication with the second flow collecting zone through part of the heating channel, and the first flow collecting zone is in communication with the second flow collecting zone through the third flow collecting zone.

14. The electric heater according to claim 3, wherein the electric heater comprises a drive module, the drive module is electrically connected with the heating element and the control module, the drive module is electrically connected with the control module, the drive module and the control module are located on a same side of the cover body, the drive module and the heating element are located on two sides of the cover body, and the drive module is an insulated gate bipolar transistor or a metal-oxide semiconductor field effect transistor.

15. The electric heater according to claim 4, wherein the electric heater comprises a drive module, the drive module is electrically connected with the heating element and the control module, the drive module is electrically connected with the control module, the drive module and the control module are located on a same side of the cover body, the drive module and the heating element are located on two sides of the cover body, and the drive module is an insulated gate bipolar transistor or a metal-oxide semiconductor field effect transistor.

16. The electric heater according to claim 3, wherein the strong electricity portion is fixed to the second side wall, the weak electricity portion is fixed to the second side wall, part of the strong electricity portion is located in the installation zone, part of the weak electricity portion is located in the installation zone, a conductive portion of the strong electricity portion is fixedly connected with a conductive end portion of the heating element, the strong electricity portion is electrically connected with the heating element, a conductive portion of the weak electricity portion is fixed to the electric control board, and the weak electricity portion is electrically connected with the control module; and the second side wall comprises a protruding portion, the protruding portion protrudes away from the fluid cavity, the protruding portion is in cooperation with the weak electricity portion; and the electric heater comprises an adapter plate, the control module is electrically connected with the weak electricity portion through the adapter plate, the adapter plate comprises an adapter hole and a leading end, the adapter hole is in plugging-connection with the weak electricity portion, and the leading end is in plugging-connection with the control module, or, the adapter hole is in plugging-connection with the control module, and the leading end is in plugging-connection with the weak electricity portion.

17. The electric heater according to claim 4, wherein the strong electricity portion is fixed to the second side wall, the weak electricity portion is fixed to the second side wall, part of the strong electricity portion is located in the installation zone, part of the weak electricity portion is located in the installation zone, a conductive portion of the strong electricity portion is fixedly connected with a conductive end portion of the heating element, the strong electricity portion is electrically connected with the heating element, a conductive portion of the weak electricity portion is fixed to the electric control board, and the weak electricity portion is electrically connected with the control module; and the second side wall comprises a protruding portion, the protruding portion protrudes away from the fluid cavity, the protruding portion is in cooperation with the weak electricity portion; and the electric heater comprises an adapter plate, the control module is electrically connected with the weak electricity portion through the adapter plate, the adapter plate comprises an adapter hole and a leading end, the adapter hole is in plugging-connection with the weak electricity portion, and the leading end is in plugging-connection with the control module, or, the adapter hole is in plugging-connection with the control module, and the leading end is in plugging-connection with the weak electricity portion.

18. The electric heater according to claim 6, wherein the strong electricity portion is fixed to the second side wall, the weak electricity portion is fixed to the second side wall, part of the strong electricity portion is located in the installation zone, part of the weak electricity portion is located in the installation zone, a conductive portion of the strong electricity portion is fixedly connected with a conductive end portion of the heating element, the strong electricity portion is electrically connected with the heating element, a conductive portion of the weak electricity portion is fixed to the electric control board, and the weak electricity portion is electrically connected with the control module; and the second side wall comprises a protruding portion, the protruding portion protrudes away from the fluid cavity, the protruding portion is in cooperation with the weak electricity portion; and the electric heater comprises an adapter plate, the control module is electrically connected with the weak electricity portion through the adapter plate, the adapter plate comprises an adapter hole and a leading end, the adapter hole is in plugging-connection with the weak electricity portion, and the leading end is in plugging-connection with the control module, or, the adapter hole is in plugging-connection with the control module, and the leading end is in plugging-connection with the weak electricity portion.

* * * * *